United States Patent
Kawahara et al.

(10) Patent No.: US 9,293,937 B2
(45) Date of Patent: Mar. 22, 2016

(54) ELECTRIC STORAGE DEVICE

(75) Inventors: Youhei Kawahara, Tokyo (JP); Ryouhei Nakao, Tokyo (JP); Akihiko Kudo, Hitachinaka (JP); Akihiko Emori, Hitachinaka (JP); Keiichiro Okawa, Hitachinaka (JP); Yoshinori Aoshima, Hitachinaka (JP)

(73) Assignee: HITACHI AUTOMOTIVE SYSTEMS, LTD., Ibaraki (JP)

( * ) Notice: Subject to any disclaimer, the term of this patent is extended or adjusted under 35 U.S.C. 154(b) by 96 days.

(21) Appl. No.: 14/112,455

(22) PCT Filed: Apr. 18, 2011

(86) PCT No.: PCT/JP2011/059537
§ 371 (c)(1),
(2), (4) Date: Nov. 1, 2013

(87) PCT Pub. No.: WO2012/143996
PCT Pub. Date: Oct. 26, 2012

(65) Prior Publication Data
US 2014/0042973 A1 Feb. 13, 2014

(51) Int. Cl.
*H02J 7/00* (2006.01)
*H01M 10/44* (2006.01)
*H02J 7/02* (2006.01)

(52) U.S. Cl.
CPC ........ *H02J 7/0068* (2013.01); *H01M 10/441* (2013.01); *H01M 10/443* (2013.01); *H02J 7/02* (2013.01)

(58) Field of Classification Search
CPC ........ H02J 7/007; H02J 7/04; H02J 2007/005
USPC .......................................................... 320/118
See application file for complete search history.

(56) References Cited

U.S. PATENT DOCUMENTS

| | | | |
|---|---|---|---|
| 5,998,969 A * | 12/1999 | Tsuji et al. ............... | 320/132 |
| 2008/0091363 A1* | 4/2008 | Lim et al. ................ | 702/63 |
| 2008/0103709 A1* | 5/2008 | Yun et al. ................ | 702/63 |
| 2008/0254347 A1* | 10/2008 | Palladino ................. | 429/90 |
| 2009/0024338 A1* | 1/2009 | Suzuki ..................... | 702/63 |
| 2009/0167248 A1* | 7/2009 | Murao et al. ............ | 320/134 |

(Continued)

FOREIGN PATENT DOCUMENTS

| | | |
|---|---|---|
| JP | 2000-312443 A | 11/2000 |
| JP | 2004-187399 A | 7/2004 |

(Continued)

*Primary Examiner* — Suchin Parihar
(74) *Attorney, Agent, or Firm* — Volpe and Koenig, P.C.

(57) ABSTRACT

An electric storage device includes an assembled battery including a plurality of electric cells connected in series; an assembled battery control unit that estimates internal resistances of the plurality of electric cells, or a magnitude relationship of the internal resistances of the plurality of electric cells; an assembled battery control unit that calculates such a discharge quantity that an SOC after the electric cells have been discharged becomes lower as the internal resistance of the electric cells, which is estimated by the assembled battery control unit, is larger, or as the magnitude relationship of the internal resistances of the electric cells is estimated to be larger by the assembled battery control unit, for each of the electric cells; and electric cell control units that discharge each of the plurality of electric cells on the basis of the discharge quantity calculated by the assembled battery control unit.

20 Claims, 27 Drawing Sheets

(56) References Cited

U.S. PATENT DOCUMENTS

| | | | |
|---|---|---|---|
| 2009/0187359 A1* | 7/2009 | Hood et al. | 702/63 |
| 2010/0023285 A1* | 1/2010 | Nakanishi | 702/63 |
| 2011/0234167 A1* | 9/2011 | Kao et al. | 320/132 |
| 2011/0270477 A1* | 11/2011 | Ueki | 701/22 |
| 2012/0323512 A1* | 12/2012 | Rhodin | 702/63 |
| 2013/0027047 A1* | 1/2013 | Yoshioka et al. | 324/426 |
| 2013/0041607 A1* | 2/2013 | Zimmerman et al. | 702/63 |
| 2014/0015469 A1* | 1/2014 | Beaston et al. | 320/101 |
| 2014/0111164 A1* | 4/2014 | Ohkawa et al. | 320/134 |
| 2014/0225622 A1* | 8/2014 | Kudo et al. | 324/433 |
| 2015/0280294 A1* | 10/2015 | Shin et al. | 320/132 |

FOREIGN PATENT DOCUMENTS

| | | |
|---|---|---|
| JP | 2004-215322 A | 7/2004 |
| JP | 2007-242400 A | 9/2007 |
| JP | 2008-154317 A | 7/2008 |
| JP | 2010-141956 A | 6/2010 |
| JP | 2011-061955 A | 3/2011 |

* cited by examiner

FIG.13
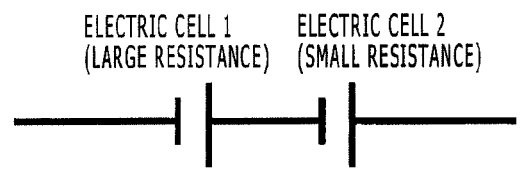
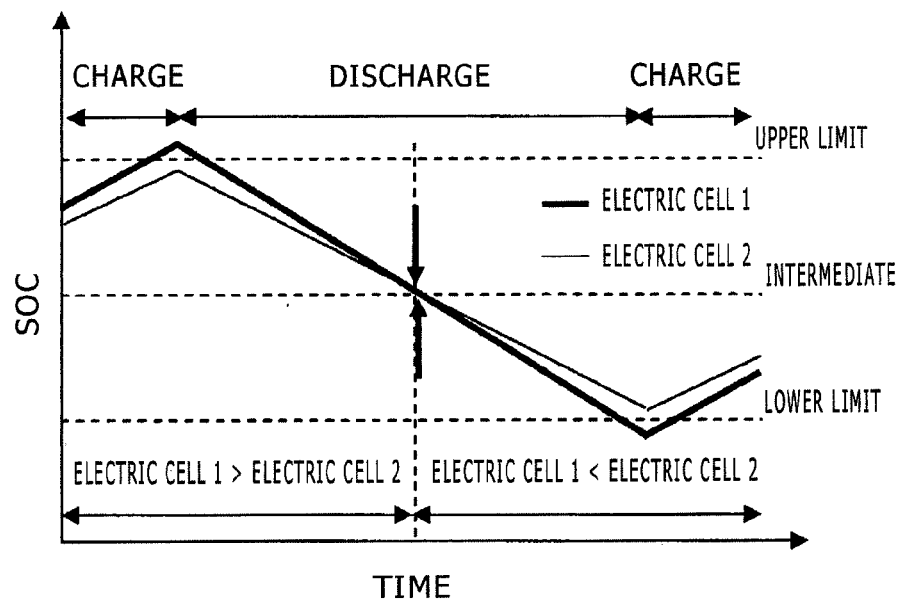

FIG. 14
(a) SOC MANAGEMENT AFTER OPERATION OF RESISTANCE EQUALIZING MEANS
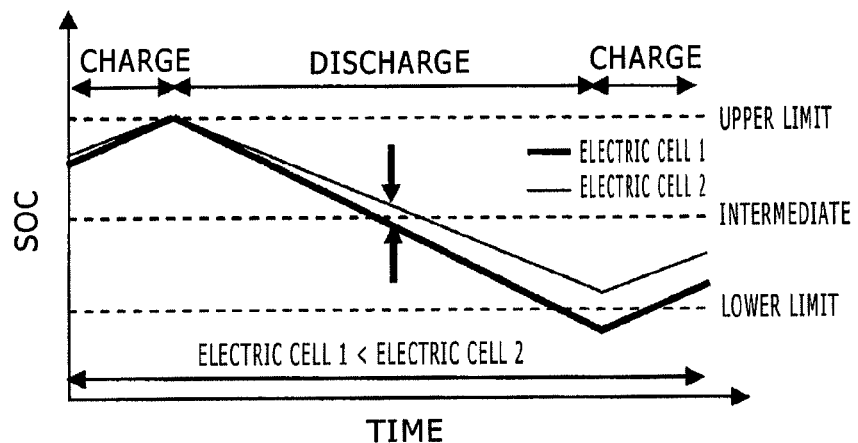
(b) METHOD OF REALIZING SOC CONTROL
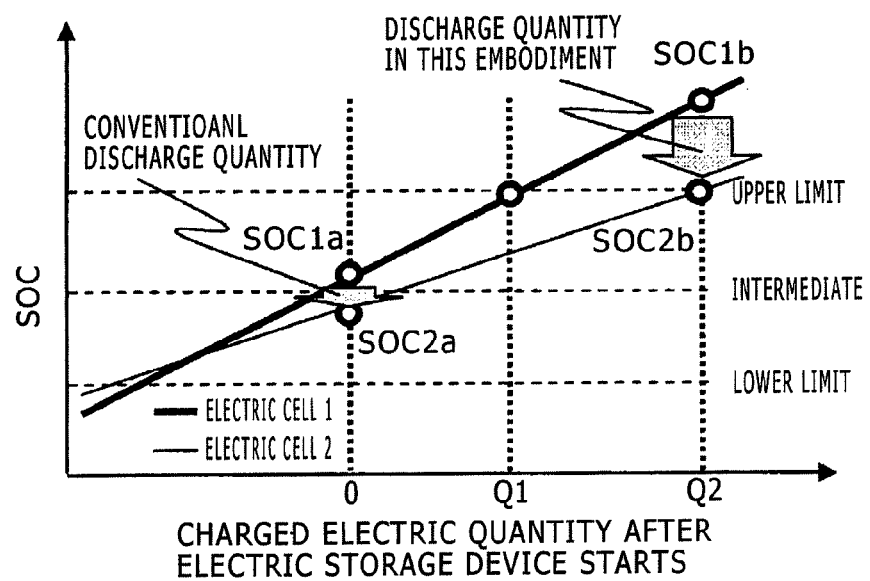

FIG. 16
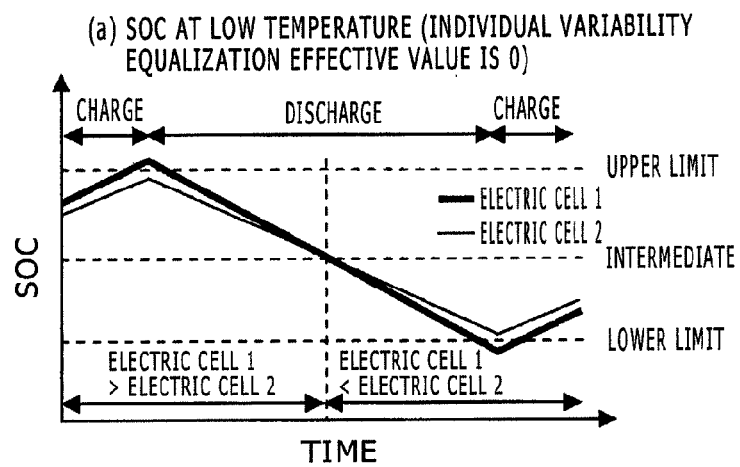
(a) SOC AT LOW TEMPERATURE (INDIVIDUAL VARIABILITY EQUALIZATION EFFECTIVE VALUE IS 0)
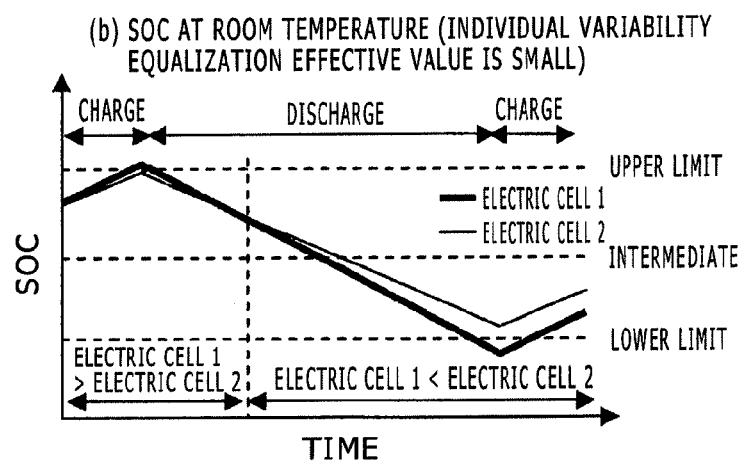
(b) SOC AT ROOM TEMPERATURE (INDIVIDUAL VARIABILITY EQUALIZATION EFFECTIVE VALUE IS SMALL)
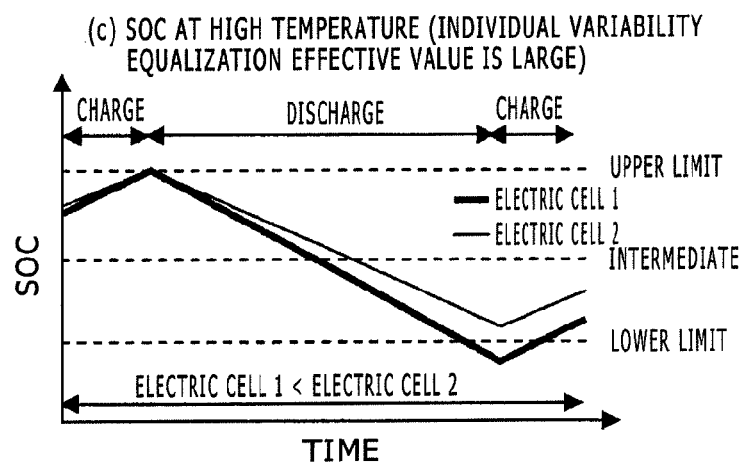
(c) SOC AT HIGH TEMPERATURE (INDIVIDUAL VARIABILITY EQUALIZATION EFFECTIVE VALUE IS LARGE)

FIG.21
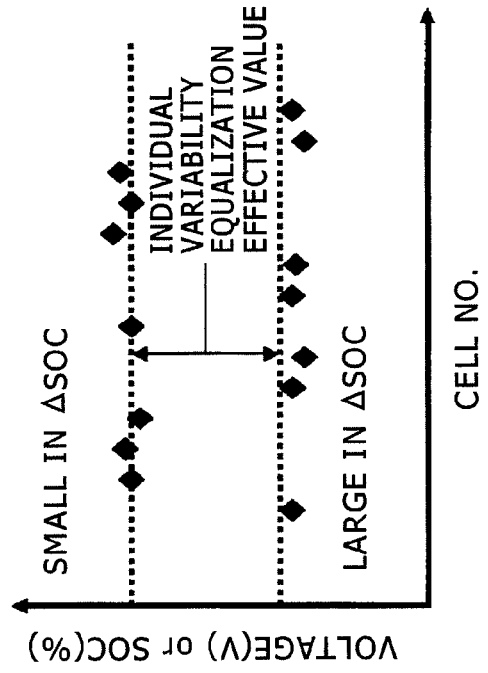
(a) MAGNITUDE DETERMINATION OF CAPACITY
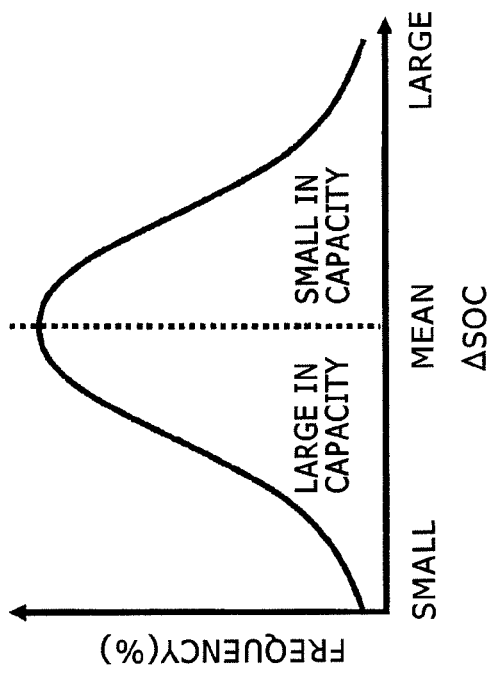
(b) ELECTRIC CELL CONTROL EXAMPLE AFTER CAPACITY MAGNITUDE DETERMINATION FIG. 22
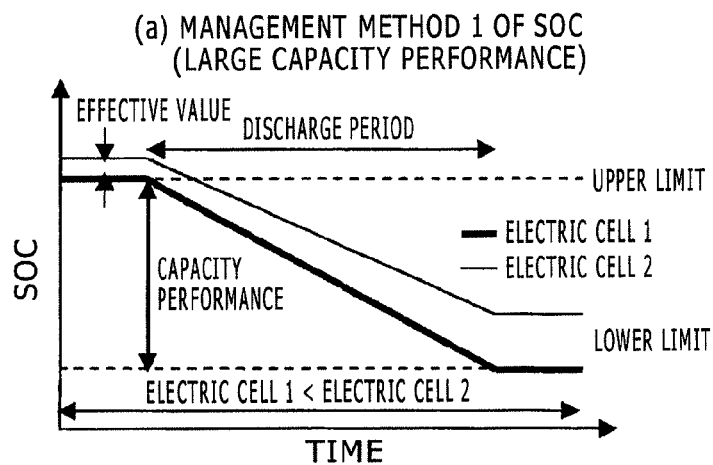
(a) MANAGEMENT METHOD 1 OF SOC
(LARGE CAPACITY PERFORMANCE)
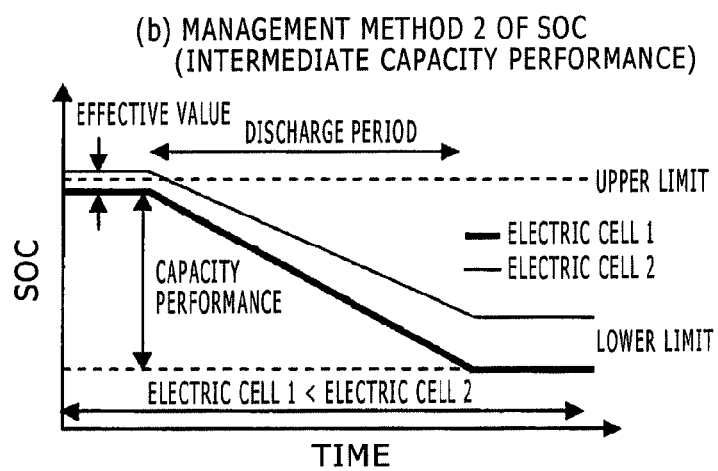
(b) MANAGEMENT METHOD 2 OF SOC
(INTERMEDIATE CAPACITY PERFORMANCE)
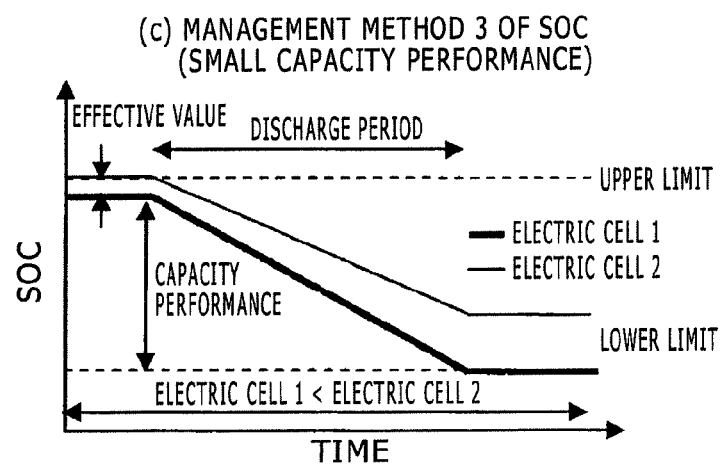
(c) MANAGEMENT METHOD 3 OF SOC
(SMALL CAPACITY PERFORMANCE)

FIG. 24
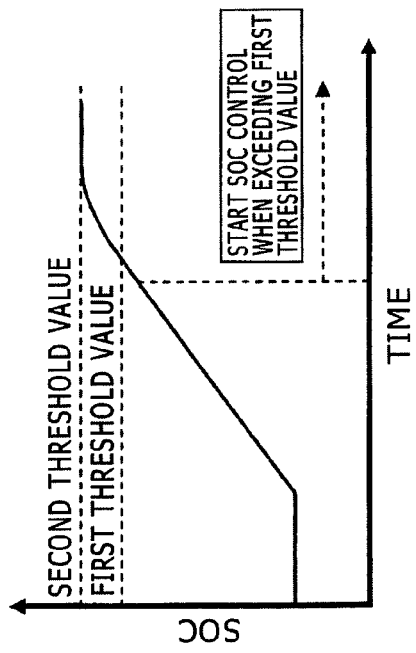
(b) CHARGING METHOD 2
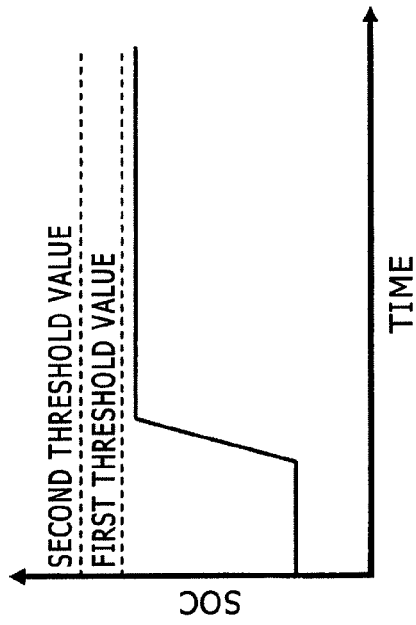
(a) CHARGING METHOD 1

ELECTRIC STORAGE DEVICE

TECHNICAL FIELD

The present invention relates to an electric storage device that includes an assembled battery having a plurality of electric cells (secondary cells) connected in series.

BACKGROUND ART

A power supply device, a distributed power storage device, and an electric vehicle, using an assembled battery having a plurality of secondary cells have a battery management device that optimally manages the secondary cells mounted thereon. As a state of the secondary cells that are managed by the battery management device, a state of charge (state of charge: SOC) indicating how much the secondary cell is charged, or how much a dischargeable charge amount remains is a typical example.

In the power supply device using a plurality of secondary cells connected in series, an SOC equalizing function is implemented for the purpose of maintaining an SOC dispersion attributable to an individual variability of self-discharge of the secondary cells within a given range. Also, there is an individual variability in an internal resistance and a full charging capacity of the secondary cells, and the internal resistance and the full charging capacity are also changed depending on an environmental situation or a use status. When the performances of the plurality of secondary cells configuring the assembled battery are largely dispersed, a lifetime of the assembled battery is determined according to the most deteriorated secondary cell.

Under the circumstances, there has been proposed a method in which a rate of the remaining capacity to the full charging capacity in each of the cells during charge and discharge operation is set to be lower as the temperature of the cell is higher during the charge and discharge operation, to thereby keep an even performance (for example, refer to Patent Literature 1).

CITATION LIST

Patent Literature

Patent Literature 1: Japanese Unexamined Patent Application Publication No. 2007-242400

SUMMARY OF INVENTION

Technical Problem

Incidentally, when the individual variability of the internal resistance or the full charging capacity occurs due to a factor other than the temperature, in the above-mentioned device that controls the remaining capacity rate on the basis of a difference in the temperature, it is determined the deterioration is also substantially identical if the temperature is substantially identical. For that reason, there is a risk that the device does not properly function from the viewpoint of elimination of the individual variability caused by factors except for the influence of the temperature.

Solution to Problem

According to a first aspect of the present invention, there is provided an electric storage device, including: an assembled battery having a plurality of electric cells connected in series; internal resistance estimating means for estimating internal resistances of the plurality of electric cells or a magnitude relationship of the internal resistances of the plurality of electric cells; discharge quantity calculating means for calculating such discharge quantities that SOCs of the electric cells after the electric cells are discharged become lower as the internal resistances of the electric cells, which has been estimated by the internal resistance estimating means, are larger, or as the magnitude relationship of the internal resistances of the electric cells is estimated to be larger by the internal resistance estimating means, for each of the electric cells; and a discharging circuit that discharges the plurality of electric cells on the basis of the discharge quantity calculated by the discharge quantity calculating means.

According to a second aspect of the present invention, there is provided the electric storage device according to the first aspect, including: a voltage measurement unit that measures voltages across the plurality of electric cells before a current that flows in the assembled battery is changed, and after the current is changed, in which the internal resistance estimating means estimates the magnitude relationship of the internal resistance from a difference between the voltages across the plurality of electric cells before the current is changed and the voltage across the plurality of electric cells after the current is changed, which are measured by the voltage measurement unit.

According to a third aspect of the present invention, there is provided the electric storage device according to the first aspect, including: a voltage measurement unit that measures the voltages across the plurality of electric cells; and a current measurement unit that measures a current value flowing in the plurality of electric cells connected in series, in which the internal resistance estimating means estimates the respective internal resistances of the plurality of electric cells on the basis of the voltage values measured by the voltage measurement unit, and the current value measured by the current measurement unit.

According to a fourth aspect of the present invention, there is provided an electric storage device, including: an assembled battery having a plurality of electric cells connected in series; full charging capacity estimating means for estimating full charging capacities of the plurality of electric cells or a magnitude relationship of the full charging capacities of the plurality of electric cells; discharge quantity calculating means for calculating such a discharge quantity that SOCs after the electric cells are discharged become lower as the full charging capacities of the electric cells, which are estimated by the full charging capacity estimating means, are smaller, or as the magnitude relationship of the full charging capacities of the electric cells is estimated to be smaller by the full charging capacity estimating means, for each of the electric cells; and a discharging circuit that discharges the plurality of electric cells on the basis of the discharge quantity calculated by the discharge quantity calculating means.

According to a fifth aspect of the present invention, there is provided the electric storage device according to the fourth aspect, including: a voltage measurement unit that measures voltages across the plurality of electric cells which are in a no-load state before the charge and discharge operation of the assembled battery is conducted, and voltages across the plurality of electric cells which are in the no-load state after the charge and discharge operation of the assembled battery is completed, in which the full charging capacity estimating means estimates a magnitude relationship of the full charging capacities from a difference between the voltages across the plurality of electric cells before the charge and discharge operation is conducted, and the voltages across the plurality of electric cells after the charge and discharge operation is completed, which are measured by the voltage measurement unit, or converts the voltage across the plurality of electric cells before the charge and discharge operation is conducted into SOCs, and converts the voltages across the plurality of electric cells after the charge and discharge operation is completed into the SOCs, to estimate the magnitude relationship of the full charging capacities from a difference between the two SOCs.

According to a sixth aspect of the present invention, there is provided the electric storage device according to the fourth aspect, including: a voltage measurement unit that measures the voltages across the plurality of electric cells; and a current measurement unit that measures a current value flowing in the plurality of electric cells connected in series, in which the full charging capacity estimating means estimates the respective full charging capacities of the plurality of electric cells on the basis of the voltage values measured by the voltage measurement unit, and the current value measured by the current measurement unit.

According to a seventh aspect of the present invention, there is provided the electric storage device according to the sixth aspect, including: a storage unit in which default values of the respective full charging capacities of the plurality of electric cells are stored in advance; and rewriting means for rewriting, if the corresponding default full charging capacity stored in the storage unit into the calculated full charging capacity, in which the discharge quantity calculating means calculates such a discharge quantity that the SOCs after the electric cells are discharged become lower as the full charging capacities of the electric cells, which are stored in the storage unit, are smaller, for each of the electric cells.

According to an eighth aspect of the present invention, there is provided the electric storage device according to the second or fifth aspect, in which the discharge quantity is a discharge quantity in which the SOC difference after the electric cells are discharged becomes equal to or larger than an SOC error caused by a measurement error of the voltage measurement unit.

According to a ninth aspect of the present invention, there is provided the electric storage device according to any one of the second, fifth, and eighth aspects, in which the discharge quantity estimating means classifies the plurality of electric cells into a plurality of groups according to a magnitude of the voltage difference calculated by the calculating means, sets the SOC after the electric cells are discharged for each of the groups, and estimates the discharge quantities of the plurality of electric cells on the basis of those set values.

According to a tenth aspect of the present invention, there is provided the electric storage device according to any one of the first to ninth aspects, in which the discharge quantity by the discharging circuit is set to be larger as the temperature of the assembled battery is higher, or as the SOC of the assembled battery is higher.

According to an eleventh aspect of the present invention, there is provided an electric storage device, including: an assembled battery having a plurality of electric cells connected in series; a voltage measurement unit that measures voltages across the plurality of electric cells; a current measurement unit that measures a current value flowing in the plurality of electric cells connected in series; SOC estimating means for estimating SOCs on the basis of the voltage values measured by the voltage measurement unit; arrival SOC estimating means for estimating respective arrival SOCs when the plurality of electric cells is charged by a given charging quantity from a time of estimating the SOC by the SOC estimating means; full charging capacity estimating means for estimating the respective full charging capacities of the plurality of electric cells on the basis of the voltage values measured by the voltage measurement unit, and the current value measured by the current measurement unit; and discharge quantity calculating means for calculating such discharge quantities that the SOCs of the respective electric cells match each other when the plurality of electric cells is each charged by a given charging quantity, on the basis of the SOCs estimated by the SOC estimating means, the arrival SOCs estimated by the arrival SOC estimating means, and the full charging capacities estimated by the full charging capacity estimating means.

According to a twelfth aspect of the present invention, there is provided the electric storage device according to the eleventh aspect in which the given charging quantity is set so that the electric cells charged by the given charging quantity match each other at an upper limit SOC of a battery use range.

According to a thirteenth aspect of the present invention, there is provided the electric storage device according to the eleventh aspect, in which the given charging quantity is set to be larger as the temperature of the assembled battery is higher.

According to a fourteenth aspect of the present invention, there is provided the electric storage device according to any one of the first to thirteenth aspects, including: a rapid charging determination unit that determines whether the charge operation when charging the assembled battery by an external power supply is rapid charge operation, in which the charging circuit does not conduct the discharge operation if the rapid charging determination unit determines that the charge operation is the rapid charge operation.

According to a fifteenth aspect of the present invention, there is provided the electric storage device according to any one of the first to thirteenth aspects, including: a temperature determination unit that determines whether a rising temperature of one or more of the electric cells configuring the assembled battery is equal to or higher than a threshold value, in which the discharging circuit does not conduct the discharge operation if the temperature determination unit determines that the rising temperature is equal to or higher than the threshold value.

According to a sixteenth aspect of the present invention, there is provided the electric storage device according to any one of the first to thirteenth aspects, further including: limiting means for limiting an allowable current value and an allowable power value when charging or discharging the assembled battery to smaller values when the discharge operation is conducted by the discharging circuit.

According to a seventeenth aspect of the present invention, there is provided the electric storage device according to any one of the first to thirteenth aspects, further including: changing means for changing an upper limit SOC or a lower limit SOC when charging or discharging the assembled battery to a lower value when the discharge operation is conducted by the discharging circuit.

Advantageous Effects of Invention

According to the present invention, when an individual variability occurs in the performances of the electric cells such as the internal resistances or the full charging capacities, the performances can be equalized, and the plurality of electric cells can be easily managed.

BRIEF DESCRIPTION OF DRAWINGS

FIG. 13 is a diagram illustrating a conventional SOC management.

FIG. 14 is a diagram illustrating an SOC management according to a second embodiment.

FIG. 16 is a diagram illustrating an SOC management according to a third embodiment.

FIG. 21 is a diagram illustrating a magnitude relationship determination method of the full charging capacities of the plurality of electric cells 111, and a control example of the electric cell voltage and the SOC by the capacitance equalization unit 155.

FIG. 22 is a diagram illustrating a control example of the SOC of the electric cells by the capacitance equalization unit 155.

FIG. 24 is a diagram illustrating processing contents according to a charging method.

DESCRIPTION OF EMBODIMENTS

Hereinafter, embodiments of the present invention will be described with reference to the drawings. In this embodiment, a description will be given of an example in which the present invention is applied to an electric storage device that configures a power supply of a hybrid electric vehicle (HEV), a plug-in hybrid electric vehicle (PHEV), or an electric vehicle (EV). The present invention is not limited to the HEV, the PHEV, or the EV, but can be extensively applied to a distributed power storage device, or a variety of electric storage devices used for rail cars.

First Embodiment

Figure 1:
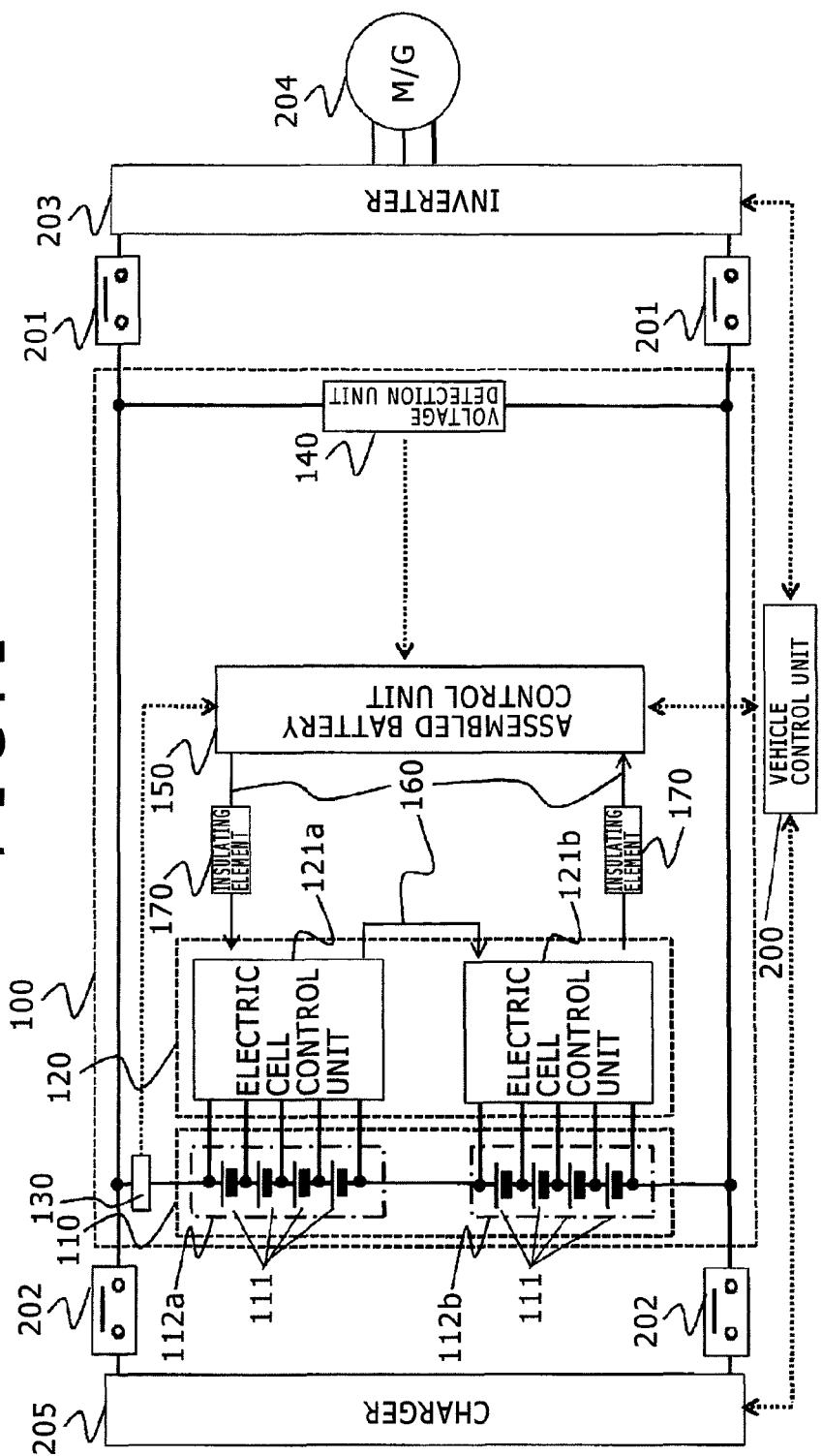
FIG. 1 is a diagram illustrating a configuration example of an electric storage device according to embodiment first embodiment.

A first embodiment of the present invention will be described with reference to FIGS. 1 to 12. FIG. 1 is a diagram illustrating a configuration example of an electric storage device according to this embodiment, and illustrates the electric storage device (battery system 100) of a plug-in hybrid electric vehicle. The battery system 100 having an assembled battery 110 as electric storage means is connected to an inverter 203 through relays 201. Also, the battery system 100 can be connected to a charger 205 through relays 202, and can be charged by the aid of the charger 205 from an external power supply. In the case of the HEV where the assembled battery 110 is not charged with the aid of the external power supply, the relays 202 and the charger 205 are not required.

First, a configuration of the battery system 100 will be described. The battery system 100 includes the assembled battery 110 including a plurality of electric cells 111, an electric cell management unit 120 that manages a state of the electric cells 111, a current detection unit 130 that detects a current flowing in the assembled battery 110, a voltage detection unit 140 that detects a total voltage across the assembled battery 110, and an assembled battery control unit 150 that controls the assembled battery 110.

The assembled battery 110 is configured to electrically connect the plurality of electric cells 111 that enables storage and discharge (charge/discharge of a DC power) of an electric energy, in series. In this example, it is assumed that the electric cells 111 are formed of lithium-ion batteries having an output voltage ranging from 3.0 to 4.2 V (mean output voltage: 3.6 V). The electric cells 111 according to this embodiment are applicable to any devices that can store and discharge electricity, in which the progression of deterioration has an SOC dependency which will be described in detail later. Also, in the assembled battery 110 illustrated in FIG. 1, the electric cells 111 are connected in series with each other. However, the electric cells 111 connected in parallel may be connected in series, or the electric cells 111 connected in series may be connected in parallel.

The electric cells 111 that configure the assembled battery 110 may be grouped into a given unit number for the purpose of managing and controlling a state of the batteries. The grouped electric cells 111 are electrically connected in series to configure electric cell groups 112. The given unit number may be for example, the number such as 1, 4, 6, . . . , with equal sections, or composite sections such as the combination of 4 and 6.

In this embodiment, for simplification of the description, the assembled battery 110 is configured so that four electric cells 111 are electrically connected in series to configure electric cell groups 112a and 112b, and the electric cell groups 112a and 112b are also electrically connected in series with each other to provide eight electric cells 111 in total. However, in fact, the electric cell groups 112 of the required number are further connected in series to provide high voltage.

The electric cell management unit 120 monitors a state of the electric cells 111 that configure the assembled battery 110. The electric cell management unit 120 includes a plurality of electric cell control units 121a and 121b, the electric cell control unit 121a is allocated to the electric cell group 112a, and the electric cell control unit 121b is allocated to the electric cell group 112b. The respective electric cell control units 121a and 121b operate while receiving electric powers from the electric cell groups 112a and 112b to which the electric cell control units 121a and 121b are allocated, and monitor and control states of the respective electric cells 111 configuring the respective electric cell groups 121a and 121b.

The assembled battery control unit 150 and the electric cell management unit 120 transmit and receive signals with respect to each other by signal communication units 160 through insulating elements 170 represented by photocouplers. The reason that the insulating elements 170 are provided is because an operation power supply is different between the assembled battery control unit 150 and the electric cell management unit 120. In this embodiment, the electric cell management unit 120 operates while receiving an electric power from the assembled battery 110 whereas the assembled battery control unit 150 uses an in-vehicle accessory battery (for example, 14V battery) as a power supply. The insulating elements 170 may be mounted on a circuit board for realizing a function of the electric cell management unit 120, or if the function of the electric cell management unit 120 and a function of the assembled battery control unit 150 are realized on the same substrate, the insulating elements 170 are mounted on the same substrate.

The above-mentioned electric cell control units 121a and 121b are connected in series in a descending order of the potentials of the electric cell groups 112a and 112b which are monitored by the electric cell control units 121a and 121b, respectively. A signal transmitted by the assembled battery control unit 150 is input to the electric cell control unit 121a through the signal communication units 160 and the insulating elements 170. Likewise, the signal communication unit 160 is disposed between an output of the electric cell control unit 121a and an input of the electric cell control unit 121b, and a signal is transmitted by the signal communication unit 160. An output of the electric cell control unit 121b is transmitted to an input of the assembled battery control unit 150 through the insulating elements 170 and the signal communication units 160.

In this way, the assembled battery control unit 150 and the electric cell control units 121a, 121b are connected by the signal communication units 160 in a looped fashion. The loop connection is called "daisy chain connection", "linked connection", or "one-after-another connection". In this embodiment, the above-mentioned connection and signal transmission/reception mode are applied. Alternatively, another connection mode can be applied if the transmission/reception of the signal can be realized with the connection of the assembled battery control unit 150 and the electric cell control units 121a, 121b.

The assembled battery control unit 150 receives a battery voltage and temperature of the electric cells 111 transmitted from the electric cell management unit 120, a current value transmitted from the current detection unit 130, and a total voltage value of the assembled battery 110 transmitted from the voltage detection unit 140. The assembled battery control unit 150 detects a state of the electric cells 111, the electric cell groups 112 configured by the electric cells 111, or the assembled battery 110 configured by the electric cell groups 112 on the basis of the above information, and information stored by the assembled battery control unit 150 in advance or information stored by a controller installed outside of the assembled battery control unit 150 in advance.

The information output to the assembled battery control unit 150 by the above-mentioned electric cell management unit 120 represents a measured value of the voltage or temperature of the electric cells 111 as well as abnormality information on the electric cells 111 such as overcharge, overdischarge, or excessive temperature of the electric cells 111. In this case, the assembled battery control unit 150 implements the charge/discharge control of the assembled battery 110 taking the above abnormality contents into account.

The information stored by the assembled battery control unit 150 or a controller installed outside of the assembled battery control unit 150 in advance includes internal resistance characteristics, the capacity in a full charging state, a polarization voltage, a deterioration characteristic, individual variability information, and a correlation relationship between the SOC and an open circuit voltage (OCV: open circuit voltage), in the assembled battery 110, or the electric cells 111 or the electric cell groups 112 configuring the assembled battery 110. Further, characteristic information on the electric cell management unit 120, the electric cell control units 121a and 121b configuring the electric cell management unit 120, and the assembled battery control unit 150 can be also stored in advance.

The assembled battery control unit 150 calculates the SOC or the input/output enable current or power of one or more electric cells 111, the internal resistance, the full charging capacity, or an abnormal state on the basis of the above-mentioned measured values or the information stored in advance, or conducts calculation necessary for equalizing the SOC or voltage of the electric cells 111 configuring the assembled battery 110. Then, the assembled battery control unit 150 outputs the calculation results to the electric cell management unit 120 or a vehicle control unit 200. Specific functions of the assembled battery control unit 150 will be described later.

The vehicle control unit 200 is a control device higher in level than the assembled battery control unit 150. The vehicle control unit 200 connects the battery system 100 and the inverter 203 through the relays 201 on the basis of the information from the assembled battery control unit 150, or connects the battery system 100 and the charger 205 through the relays 202. The vehicle control unit 200 can transmit an instruction to the assembled battery control unit 150 as occasion demands, and the assembled battery control unit 150 can execute processing on the basis of the instruction from the vehicle control unit 200. Further, the connecting operation to the inverter 203 or the charger 205 through the relays 201 or 202 may be implemented by the assembled battery control unit 150.

The charger 205 is used when charging the assembled battery 110 from an external power supply installed in a home or an electric stand (charge station). In this embodiment, the charger 205 controls a charge voltage or a charge current according to the instruction output from the vehicle control unit 200 on the basis of the information from the assembled battery control unit 150. The instruction to the charger 205 may be directly transmitted by the assembled battery control unit 150. Also, the charger 205 may be installed on a vehicle side according to the configuration of the vehicle, the performance of the charger 205, an intended purpose, an installation condition of the external power supply. The charger 205 may be installed outside of the vehicle. When the hybrid electric vehicle is configured, the charger 205 is not required.

In the vehicle system of FIG. 1, in a travel state, the battery system 100 is connected to the inverter 203, and a motor generator 204 is driven by an energy stored in the assembled battery 110, under the management of the vehicle control unit 200. In a regenerative state, the assembled battery 110 is charged by a power energy of the motor generator 204.

Also, when the vehicle having the electric storage device of FIG. 1 is connected to the external power supply represented by the home or the electric stand, the battery system 100 and the charger 205 are connected to each other on the basis of the information transmitted by the vehicle control unit 200, and the assembled battery 110 are charged until the assembled battery 110 satisfies a given condition. An energy stored in the assembled battery 110 by this charge operation is used in a next vehicle travel state, or used for operating interior or exterior electric components of the vehicle. Further, the energy may be discharged to the external power supply represented by a domestic power supply as occasion demands.

Hereinafter, a detailed configuration of the electric cell control units 121a and 121b provided in the electric cell management unit 120 according to this embodiment will be described, and thereafter detailed processing contents of the electric cell control units 121a, 121b, and the assembled battery control unit 150 will be described.

Figure 2:
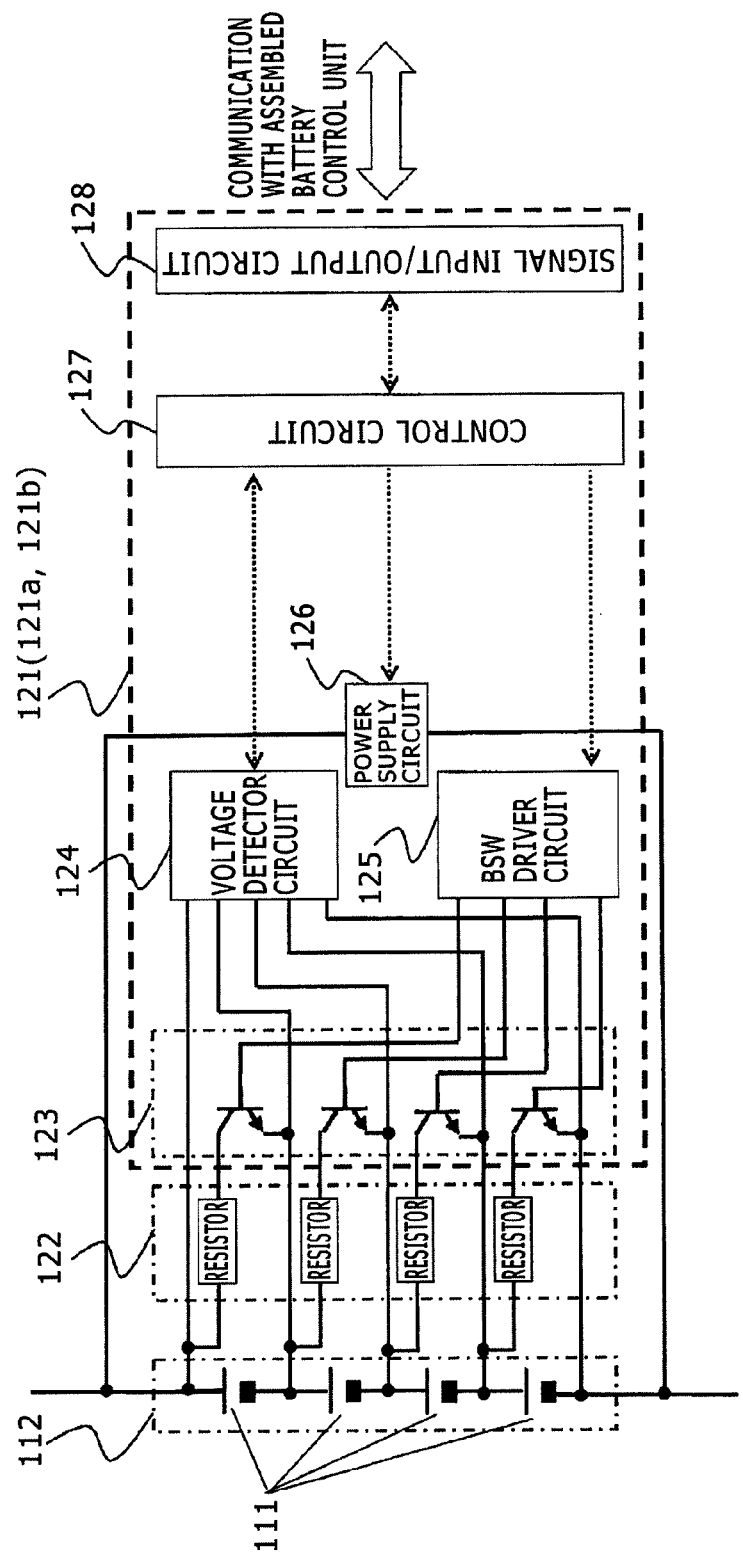
FIG. 2 is a diagram illustrating a configuration of an electric cell control unit 121.

FIG. 2 is a diagram illustrating a configuration of the electric cell control units 121a, 121b, and a periphery thereof (a part of the electric cell management unit 120). The configurations of the electric cell control units 121a and 121b are identical with each other, and the electric cell control units 121a and 121b are described as electric cell control units 121. The electric cell control unit 121 includes bypass switches 123, a BSW driver circuit 125 that drives the bypass switches 123, a voltage detector circuit 124 that measures a battery voltage of the plurality of electric cells 111 configuring the electric cell groups 112 to be managed, a power supply circuit 126 that operates the electric cell control unit 121, a control circuit 127 that controls the electric cell control unit 121 on the basis of the information from the assembled battery control unit 150, and a signal input/output circuit 128 that transmits or receives signals with respect to the assembled battery control unit 150 or the adjacent electric cell control unit 121.

The control circuit 127 is connected to the voltage detector circuit 124, the BSW driver circuit 125, the power supply circuit 126, and the signal input/output circuit 128, conducts a variety of processing, and transmits or receives the signal as occasion demands. Also, the signal input/output circuit 128 can be separated into a signal input circuit and a signal output circuit for mounting. The electric cell groups 112 correspond to the electric cell groups 112a and 112b in FIG. 1.

Bypass resistors 122 disposed outside of the electric cell control unit 121, the bypass switches 123, and the BSW driver circuit 125 are used to equalize the dispersion of the SOC or the voltage among the electric cells 111 configuring the assembled battery 110. When the BSW driver circuit 125 turns on any of the bypass switch 123 corresponding to the electric cell 111 high in the SOC or voltage, an energy stored in the electric cell 111 high in the SOC or voltage is consumed by the corresponding bypass resistor 122, as a result of which the SOC or voltage among the electric cells 111 within the assembled battery 110 is equalized. In this embodiment, the bypass switches 123 are disposed inside of the electric cell control unit 121, but may be installed outside of the electric cell control unit 121.

The assembled battery control unit 150 estimates the degree of dispersion in the SOC or voltage among the electric cells 111, and calculates the discharge quantity necessary for eliminating the dispersion of the electric cell 111 high in the SOC or voltage. Then, the assembled battery control unit 150 transmits an instruction for an operating time of the bypass switch 123 corresponding to the calculated discharge quantity to the electric cell control unit 121. The instruction transmitted by the assembled battery control unit 150 is received by the signal input/output circuit 128, and transmitted to the control circuit 127. The control circuit 127 operates the BSW driver circuit 125, and operates the bypass switch 123 disposed in correspondence with the instructed electric cell 111.

A voltage across the electric cells 111 configuring each electric cell group 112 is detected by the voltage detector circuit 124. In this embodiment, one voltage detector circuit 124 is provided for one electric cell group 112. The voltage detector circuit 124 detects the voltage value while switching the electric cell 111 to be detected to another to acquire the voltage information on all of the electric cells 111. An order of switching the electric cell 111 to another is arbitrary. For example, the switching is conducted in a top-to-down order or a down-to-top order of FIG. 2, or the switching order may be selected rotationally, or the switching order may be selected at random. Also, the switching order may be changed according to the characteristic of the electric cells 111 or a system using the electric cells 111.

The voltage detector circuit 124 may be provided for each of the electric cells 111, or the voltage detector circuit 124 may have a function of detecting the temperature information on the electric cells 111 as the voltage. In this case, the electric cells 111 is each equipped with a temperature sensor that can transmit the temperature as voltage information (not shown). As a timing for detecting the voltage or temperature, the voltage detector circuit 124 may periodically start the detection, or may start the detection according to an instruction from the control circuit 127 or the assembled battery control unit 150.

The power supply circuit 126 that operates the electric cell control unit 121 is supplied with an energy from the electric cell group 112 to be managed by the electric cell control unit 121. The power supply circuit 126 switches between a normal mode and a low consumption power mode on the basis of an instruction from the control circuit 127. When the assembled battery 110 is being charged or discharged, and the electric cells 111 need to be managed, or when all of the functions provided by the electric cell control unit 121 are necessary, for example, in a case where the instruction continues to be transmitted from the assembled battery control unit 150, the power supply circuit 126 operates as the normal mode.

On the other hand, when the assembled battery 110 is not used, or no instruction is transmitted from the assembled battery control unit 150 for a given time or longer, or when the power supply circuit 126 receives an operation stop instruction from the assembled battery control unit 150, the power supply circuit 126 shifts from the normal mode to the low consumption power mode. The low consumption power mode is a state in which a part of the function of the electric cell control unit 121 is operated so that the energy supply from the electric cell groups 112 can be reduced as compared with the normal mode. The electric cell control unit 121 that has been shifted to the low consumption power mode can be shifted to the normal mode according to the instruction from the assembled battery control unit 150.

The control circuit 127 has a function of executing a process for managing the operation of the electric cell control unit 121. The control circuit 127 receives the information on the electric cells 111, which has been detected by the voltage detector circuit 124, or the instruction from the assembled battery control unit 150 through the signal input/output circuit 128, and transmits the information to the voltage detector circuit 124, the BSW driver circuit 125, and the power supply circuit 126. The control circuit 127 may be realized by only hardware, or may implement a part of the function as software that runs on the hardware.

When no signal is transmitted from the assembled battery control unit 150 even if a given time has been elapsed, or when the control circuit 127 receives the operation stop instruction from the assembled battery control unit 150, the control circuit 127 transmits a signal for shifting the mode to the low consumption power mode to the power supply circuit 126. In the case where the electric cell control unit 121 is in the low consumption power mode, when the control circuit 127 receives the signal from the assembled battery control unit 150, the control circuit 127 transmits the signal for shifting the mode to the normal mode to the power supply circuit 126.

When the assembled battery control unit 150 acquires the voltage information on the electric cells 111 from the electric cell control unit 121, the assembled battery control unit 150 designates the electric cell control unit 121 (the electric cell control unit 121a or the electric cell control unit 121b) as a voltage acquisition target. The designated electric cell control unit 121 transmits one or more voltage information on the electric cells 111 to be managed to the assembled battery control unit 150. In this case, a voltage request signal to be transmitted by the assembled battery control unit 150 includes an address (identification No. for specifying the electric cell control unit 121) for designating the electric cell control unit 121. Also, a storage circuit within the electric cell control unit 121 stores an address for specifying the electric cell control unit 121 per se therein, and the electric cell control unit 121 implements a function for determining whether the address included in the voltage request signal indicates the electric cell control unit 121 per se.

The control circuit 127 provided in the electric cell control unit 121 confirms the address included in the voltage request signal from the assembled battery control unit 150, which has been received through the signal input/output circuit 128. If the address matches the address set in the control circuit 127 per se, the control circuit 127 transmits the voltage information on the electric cells 111 managed by the control circuit 127 per se to the assembled battery control unit 150 through the signal input/output circuit 128. Because the two electric cell control units 121a and 121b are installed in the configuration illustrated in FIG. 1, when the assembled battery control unit 150 wants to periodically receive the voltage information on all of the electric cells 111 configuring the assembled battery 110, the assembled battery control unit 150 alternately designates the two electric cell control units 121a and 121b, and transmits the voltage request signal to the designated electric cell control unit. As another method for acquiring the voltages across the electric cells 111 configuring the assembled battery 110, the plurality of electric cell control units 121 may transmit the voltages across the electric cells 111 to the assembled battery control unit 150 concurrently, on the basis of one voltage request signal from the assembled battery control unit 150.

If a dispersion in the SOC or voltage is generated among the plurality of electric cells 111 to be managed by the electric cell control unit 121, the assembled battery control unit 150 transmits a bypass switch-on instruction to the electric cell control unit 121 for the purpose of allowing any of the bypass resistor 122 to consume the energy of the electric cell 111 high in the SOC or voltage. As a result, because the SOC or voltage of the designated electric cell 111 is reduced, the dispersion in the SOC or voltage among the plurality of electric cells 111 is improved.

The bypass switch-on instruction signal for turning on the bypass switches 123, which is transmitted by the assembled battery control unit 150, includes an address for designating any electric cell control unit 121 that turns on the bypass switches 123, and further an address for designating any electric cell 111 that turns on the bypass switch 123 is also transmitted as additional information. As a method of designating any electric cell 111 that turns on the bypass switch 123, the electric cells 111 may be designated in an address fashion one by one, or data format that can concurrently change the bypass switches 123 to be in an on or off state on an electric cell group 112 basis may be applied.

The control circuit 127 confirms the address included in the bypass switch-on instruction signal from the assembled battery control unit 150, which has been received through the signal input/output circuit 128. Then, if the address matches the address set in the control circuit 127, the control circuit 127 further confirms an address or data for designating any electric cell 111 that turns on the bypass switch 123, and changes the bypass switch 123 of the electric cell 111 to be in the on-state by the BSW driver circuit 125 on the basis of the confirmation. Through the above processing, the adjustment of the SOC or voltage can be realized for each of the electric cells 111 which are managed by the electric cell control unit 121.

Figure 3:
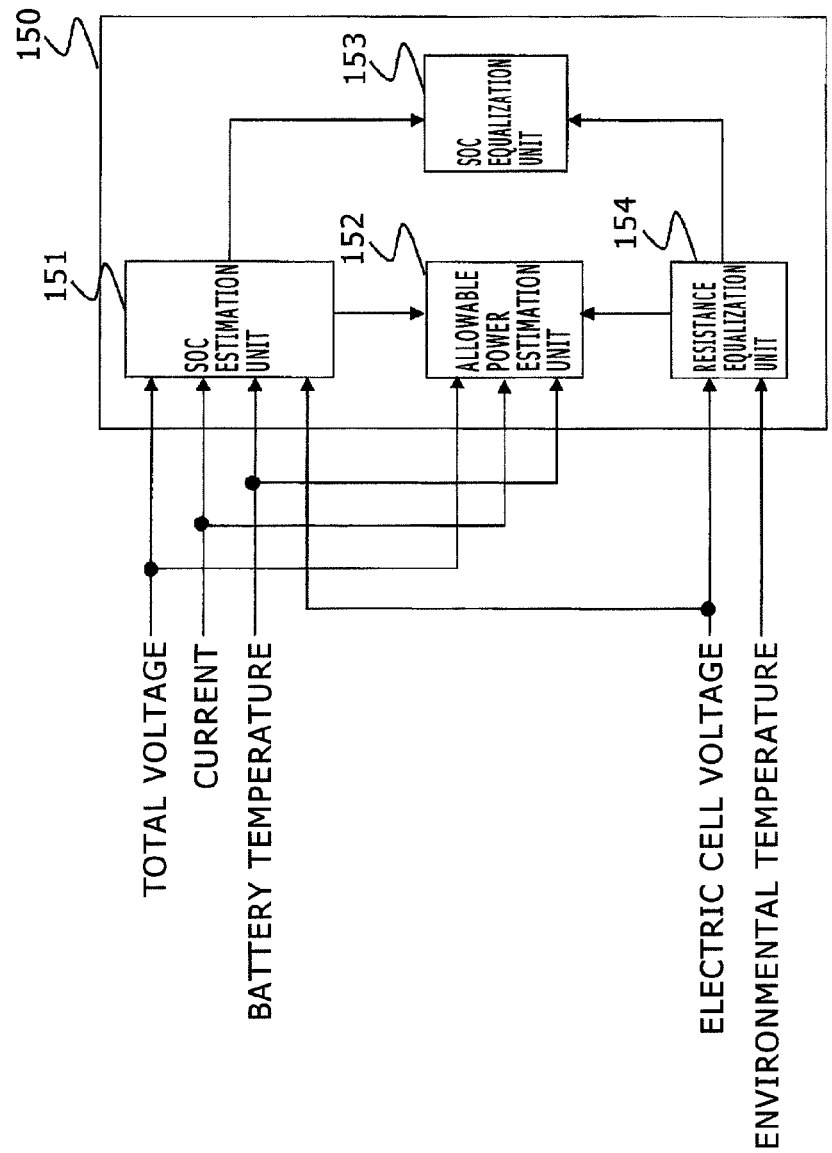
FIG. 3 is a block diagram illustrating one configuration of an assembled battery control unit 150.

Subsequently, the detailed processing contents of the assembled battery control unit 150 will be described with reference to FIG. 3. The assembled battery control unit 150 includes an SOC estimation unit 151, an allowable power estimation unit 152, an SOC equalization unit 153, and a resistance equalization unit 154. In the processing of the assembled battery control unit 150, there are used measured values of the voltage, the temperature, the total voltage, or the current of one or more electric cells 111, measured values indicative of a state in which the electric cells 111 are placed, such as the environmental temperature, and various information on the electric cells 111 or the assembled battery 110 which has been recorded in advance.

(SOC Estimation Unit 151)

Figure 4:
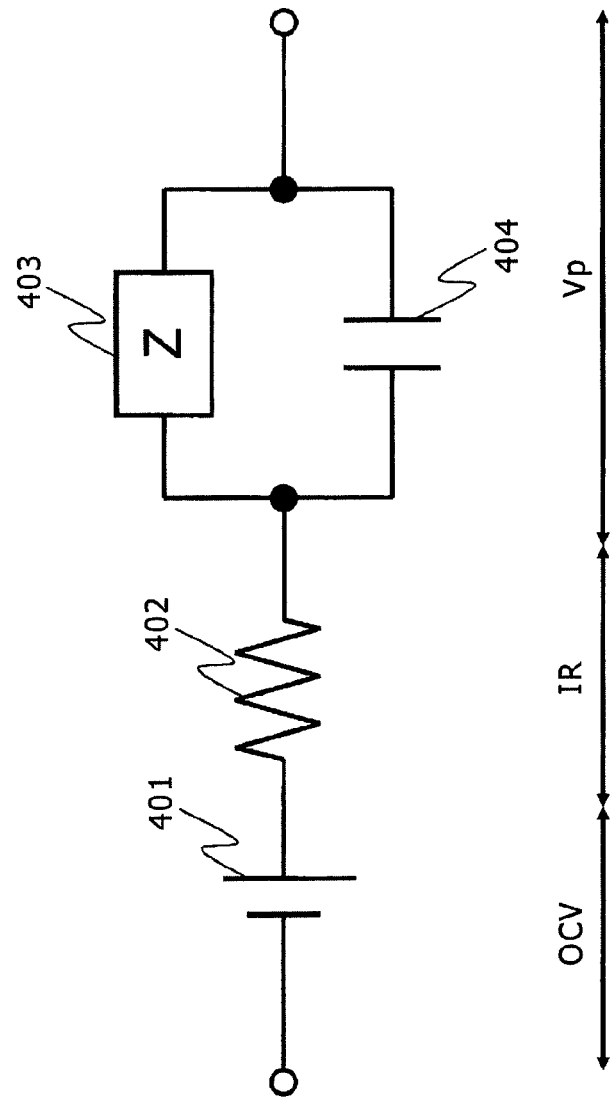
FIG. 4 is an equivalent circuit diagram of an electric cell 111.

FIG. 4 is an equivalent circuit diagram of the electric cells 111. The SOC estimation unit 151 conducts the SOC estimation of the electric cells 111 or the assembled battery 110. Referring to FIG. 4, reference numeral 401 denotes an electromotive force of the electric cells 111, that is, an open circuit voltage (OCV), 402 is an internal resistance (R), 403 is an impedance (Z), and 404 is a capacitance component (C). Each of the electric cells 111 is expressed by the internal resistance 402 and the electromotive force 401 connected in series with a parallel connection pair of the impedance 403 and the capacitance component 404. A voltage (CCV) between terminals of the electric cell 111 when a current I is supplied to the electric cell 111 is represented by the following Expression (1). In Expression (1), Vp represents a polarization voltage, and corresponds to a voltage across the parallel connection pair of Z and C.

$$CCV = OCV + I \cdot R + Vp \quad (1)$$

The OCV is used for calculation of the SOC, however, it is impossible to directly measure the OCV in a status where the electric cell 111 is being charged or discharged. For that reason, as indicated by the following Expression (2), the OCV is calculated by subtracting an IR drop and Vp from the CCV.

$$OCV = CCV - I \cdot R - Vp \quad (2)$$

Figure 5:
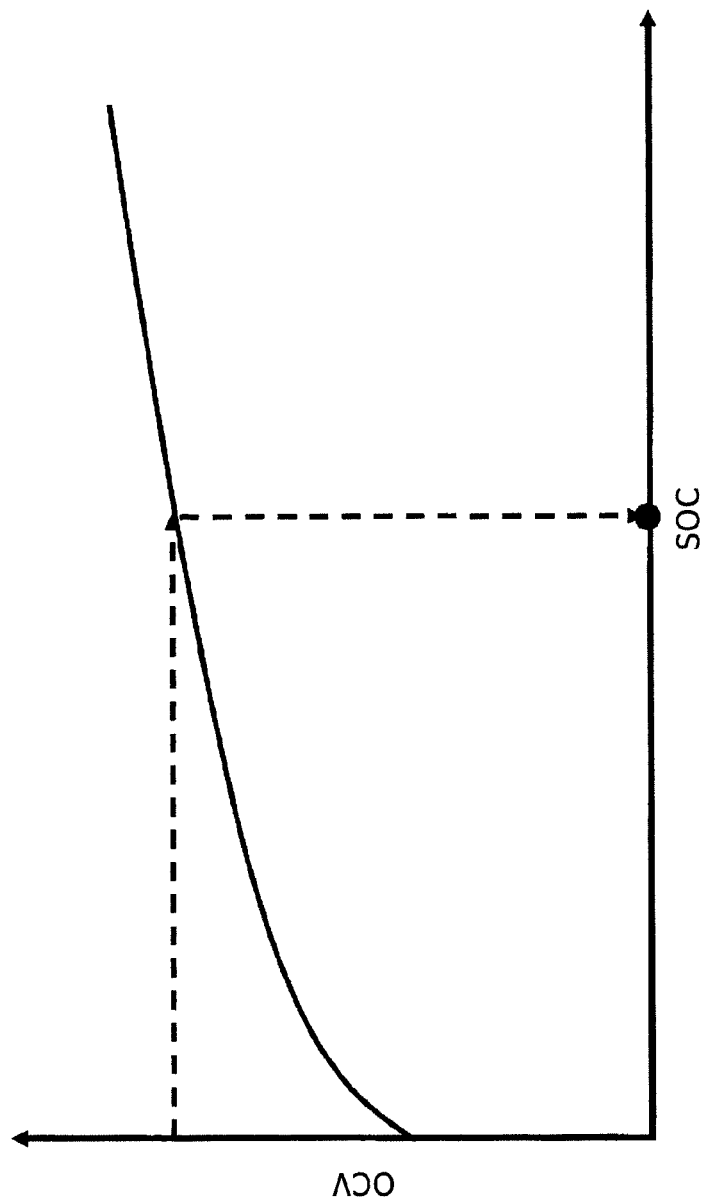
FIG. 5 is a diagram illustrating a relationship between an OCV and an SOC.

In Expression (2), R and Vp can be obtained from the characteristic information stored in the assembled battery control unit 150. Values of R and Vp are obtained according to the SOC, the temperature, or the current of the electric cell 111. On the other hand, CCV is a voltage value during the charge or discharge operation, which has been acquired by the voltage detector circuit 124, or the voltage detection unit 140 for detecting the total voltage across the assembled battery 110. The current value I can be acquired by the current detection unit 130. The OCV is calculated by Expression (2) with the use of the CCV, I, R, and Vp. Then, the SOC of the electric cell 111 is estimated from a relationship of the OCV and the SOC set in advance as illustrated in FIG. 5.

When an average SOC of the assembled battery 110 is estimated, the CCV is used with the total voltage (average voltage across the electric cells 111) of the assembled battery 110, which is acquired from the voltage detection unit 140, and R and Vp are also prepared with an average value of the electric cells 111 in advance. When the SOC estimation is conducted for each of the electric cells 111, the CCV needs to be used with the voltage across the electric cells 111, which has been acquired by the voltage detector circuit 124. Also, it is desirable to conduct the SOC estimation taking the individual variability of R and Vp among the electric cells 111 into consideration.

(Allowable Power Estimation Unit 152)

Subsequently, the allowable power estimation unit 152 will be described. An allowable current value and an allowable power value represent a current value and a power value which can be input and output by the assembled battery 110, respectively. In general, when the SOC of the assembled battery 110 is high, the output enable current value and power value are large, and the input enable current value and power value are small. On the contrary, when the SOC of the assembled battery 110 is low, the output enable current value and power value are small, and the input enable current value and power value are large. The allowable current value and the allowable power value are output to the vehicle control unit 200 installed outside of the assembled battery control unit 150.

The vehicle control unit 200 controls the assembled battery 110 to be charged or discharged within a range of the received allowable current value and allowable power value. Hereinafter, it is assumed that the current value that can be input by the assembled battery 110 is an allowable charging current Icmax, the power value that can be input by the assembled battery 110 is an allowable charging power Pcmax, the current value that can be output by the assembled battery 110 is an allowable discharging current Idmax, and the power value that can be output by the assembled battery 110 is an allowable discharging power Pdmax. The allowable charging current Icmax and the allowable discharging current Idmax are calculated by the following Expressions (3) and (4).

$$Icmax = (Vmax - OCV)/Rz \quad (3)$$

$$Idmax = (OCV - Vmin)/Rz \quad (4)$$

Figure 6:
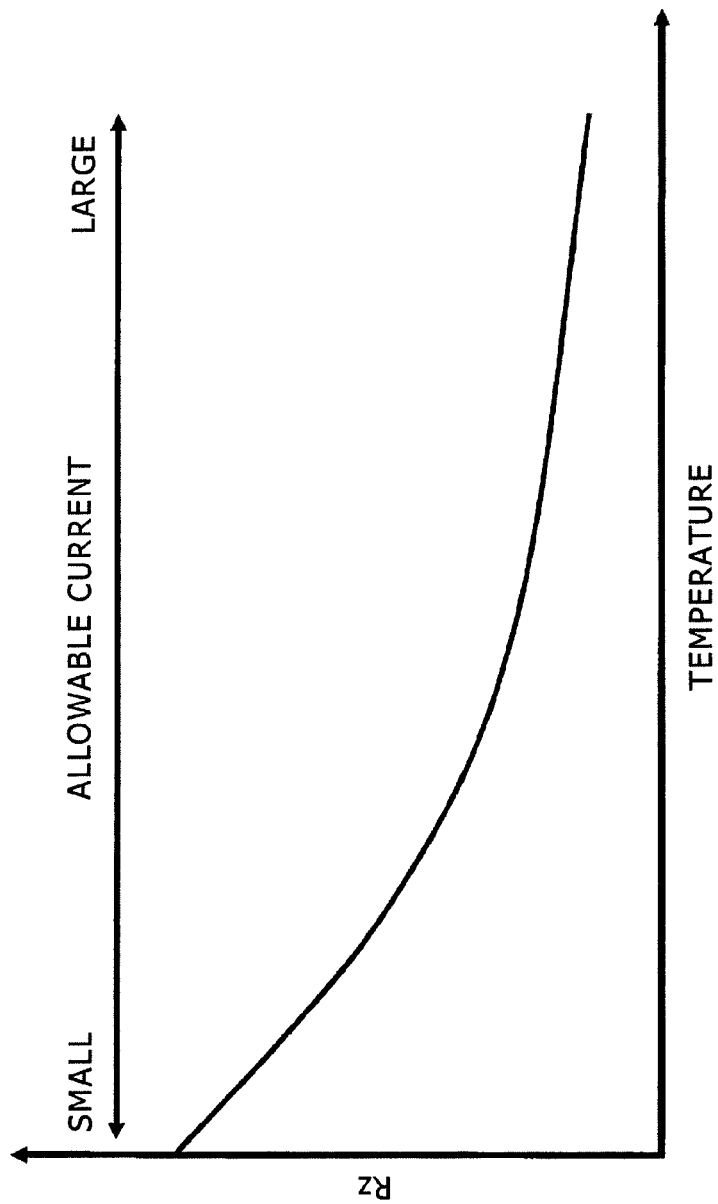
FIG. 6 is a diagram illustrating a relationship between a temperature and an internal impedance of the electric cell.

In Expressions (3) and (4), Vmax is an upper voltage of the assembled battery 110, Vmin is a lower voltage of the assembled battery 110, OCV is a present electromotive force of the assembled battery 110, and Rz is an equivalent impedance of R, Z and C of the present assembled battery 110 in FIG. 4. As illustrated in FIG. 6, because Rz is large at a low temperature and small at a high temperature, the allowable charging current Icmax and the allowable discharging current Idmax are small at the low temperature, and large at the high temperature.

The allowable charging power Pcmax is obtained as represented in Expression (5) by multiplying the allowable charging current Icmax represented by Expression (3) by a voltage Vchg across the assembled battery 110 when the allowable charging current Icmax is obtained. Also, the allowable discharging power Pdmax is obtained as represented in Expression (6) by multiplying the allowable discharging current Idmax represented by Expression (4) by a voltage Vdis across the assembled battery 110 when the allowable discharging current Idmax is obtained. The Icmax or Pcmax, and the Idmax or Pdmax are transmitted to the vehicle control unit 200 so that the charge/discharge control of the assembled battery 110 is conducted without falling outside a range of Vmax and Vmin.

$$Pcmax = Vchg \times Icmax \quad (5)$$

$$Pdmax = Vdis \times Idmax \quad (6)$$

(SOC Equalization Unit 153)

Subsequently, a description will be given of the operation of the SOC equalization unit 153 for improving the dispersion in the voltage or SOC of the electric cells 111 with reference to a flowchart of FIG. 7. In Step S701, the SOCs of all the electric cells 111 are acquired from the SOC estimation unit 151. In the SOC estimation unit 151, the voltages across all of the electric cells 111 configuring the assembled battery 110 are acquired, and the SOCs are estimated from the acquired voltages as described above.

If the voltage acquired in this situation is OCV, the SOCs of all the electric cells 111 can be easily obtained with the use of the correlation relationship of FIG. 5. Under the circumstances, it is assumed that the voltages across all the electric cells 111 are acquired at timing when the voltages can be acquired as the OCVs, and the SOCs of all the electric cells 111 are obtained with the use of the correlation relationship of FIG. 5. The timing at which the voltage can be acquired as the OCV is before the relays 201 and 202 are closed, under the circumstances the assembled battery 110 is not charged or discharged even if the relays 201 and 202 are closed, or after the charge operation of the assembled battery 110 by the charger 205 has been completed. When the assembled battery 110 is charged or discharged, but the current value thereof is small, the voltages across the electric cells 111 in this situation can be dealt with as the OCV.

In Step S702, the SOC equalization unit 153 calculates the minimum SOC after the SOCs of all the electric cells 111 have been obtained, and sets the minimum SOC as a target SOC for equalization of all the electric cells 111. In Step S703, the SOC equalization unit 153 calculates differences between the target SOC and the SOCs of all the electric cells 111, and obtains discharge times of the respective electric cells 111 using the bypass resistors 122 necessary for elimination of the differences, that is, discharge times necessary for allowing the SOCs of the respective electric cells 111 to match the target SOC, as the effective values for equalization.

In Step S704, the SOC equalization unit 153 transmits an instruction for keeping each of the bypass switches 123 in an on-state for the discharge time obtained in Step S703 to the electric cell control unit 121. The electric cell control unit 121 that receives the instruction keeps the bypass switch 123 in the on-state for the discharge time, and allows the energy stored in each electric cell 111 to be consumed by the bypass resistors 122. The discharge time of the electric cell 111 by the bypass resistor 122 is determined according to the degree of deviation (SOC of the discharge target—the minimum SOC as a reference) from the minimum SOC of the electric cell 111, the full charging capacity of the electric cell 111, and a value of the bypass current determined on the basis of the resistance value of the bypass resistance, and the voltage across the electric cells 11.

Figure 8:
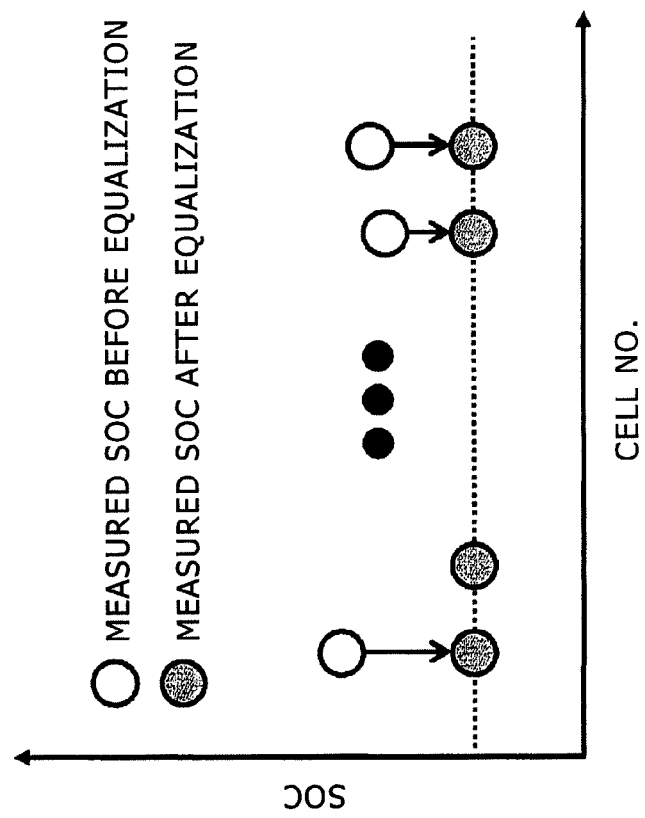
FIG. 8 is a diagram illustrating the effects of equalization.

The operation of equalizing the voltage or SOC by the SOC equalization unit 153 may be realized by allowing the SOC equalization unit 153 to manage the remaining discharge time to the bypass resistor 122, and continuously transmitting the instruction for turning on the bypass switches 123 to the electric cell control unit 121 for the discharge time. Also, there may be applied a method of transmitting the discharge time to the electric cell control unit 121, and allowing the control circuit 127 provided in the electric cell control unit 121 to manage the remaining discharge times of the electric cells 111. In this way, the on-instruction of the bypass switches 123 for equalizing the dispersion in the voltage or SOC is transmitted for each of the electric cell control units 121 with the result that the voltages or SOCs among the electric cells 111 can match each other as illustrated in FIG. 8.

In the above description, the equalization of the voltages or SOCs among the electric cells 111 is set with the minimum SOC as the target SOC. Alternatively, a margin exempting an SOC error amount caused from a voltage measurement error of the voltage detector circuit 124 provided in the electric cell control unit 121 from an object to be equalized may be ensured. If only the deviation from the minimum SOC exceeding the SOC error amount is to be discharged, the voltage or SOC equalization of the electric cells 111 taking the SOC error of the measurement error amount into account can be implemented.

Also, in equalizing the voltage or SOC of the electric cells 111, the equalization is conducted with targeting the minimum SOC. Alternatively, with targeting the mean SOC obtained from the SOCs of all the electric cells 111, the above-mentioned discharge may be implemented on only the electric cells 111 higher than this target. Also, with targeting the mean SOC obtained from the maximum SOC and the minimum SOC among all of the electric cells 111, the discharge can be implemented on only the electric cells 111 that exceed the means SOC. Further, as in the above description, even if those SOC mean values are used, with the SOC error amount caused by the voltage measurement error included in the voltage detector circuit 124 as a margin, only the deviation from the mean SOC exceeding the SOC error amount can be to be discharged.

(Resistance Equalization Unit 154)

Subsequently, the operation contents of the resistance equalization unit 154 provided in the assembled battery control unit 150 will be described with reference to a flowchart of FIG. 9. When the resistance equalization unit 154 detects a status in which the assembled battery 110 can be used, represented by the connection of the relays 201 and 202, the resistance equalization unit 154 starts to monitor the degree of temperature rising of the electric cells 111, and also starts the processing of FIG. 9. A method of monitoring the degree of temperature rising can be realized by recording a first temperature under a situation in which the assembled battery 110 is ensured to be unused, for example, before the relay connection, and obtaining a difference between the first temperature and the present temperature (second temperature) after the relay connection.

In Step S901, it is determined whether a heating value of the electric cells 111 falls within a given range, that is, whether a rising of the battery temperature falls below a threshold value. If it is determined that the heating value falls within the given range in Step S901, the processing proceeds to Step S902, and if it is determined as no, the processing of FIG. 9 is completed. As a method of detecting the rising of the battery temperature, the detection may be conducted by a magnitude of the value obtained by multiplying current values input to and output from the battery by a difference between CCV and OCV, and integrating the multiplied current values, or other method may be applied.

In Step S902, voltage changes ($\Delta V$) of the respective electric cells 111 are obtained as represented in Expression (7).

The voltage values of the respective electric cells 111 are transmitted from the electric cell control unit 121 to the resistance equalization unit 154. When the voltage changes ($\Delta V$) are obtained, the present voltage value V(t) and a previous voltage value V(t−1) are used among the transmitted voltage values. Symbol N in Expression (7) is No. (cell No.) of the electric cells 111.

$$\Delta V1 = V1(t) - V1(t-1)$$
$$\Delta V2 = V2(t) - V2(t-1)$$
$$\vdots$$
$$\Delta VN = VN(t) - VN(t-1)$$

(7)

Figure 10:
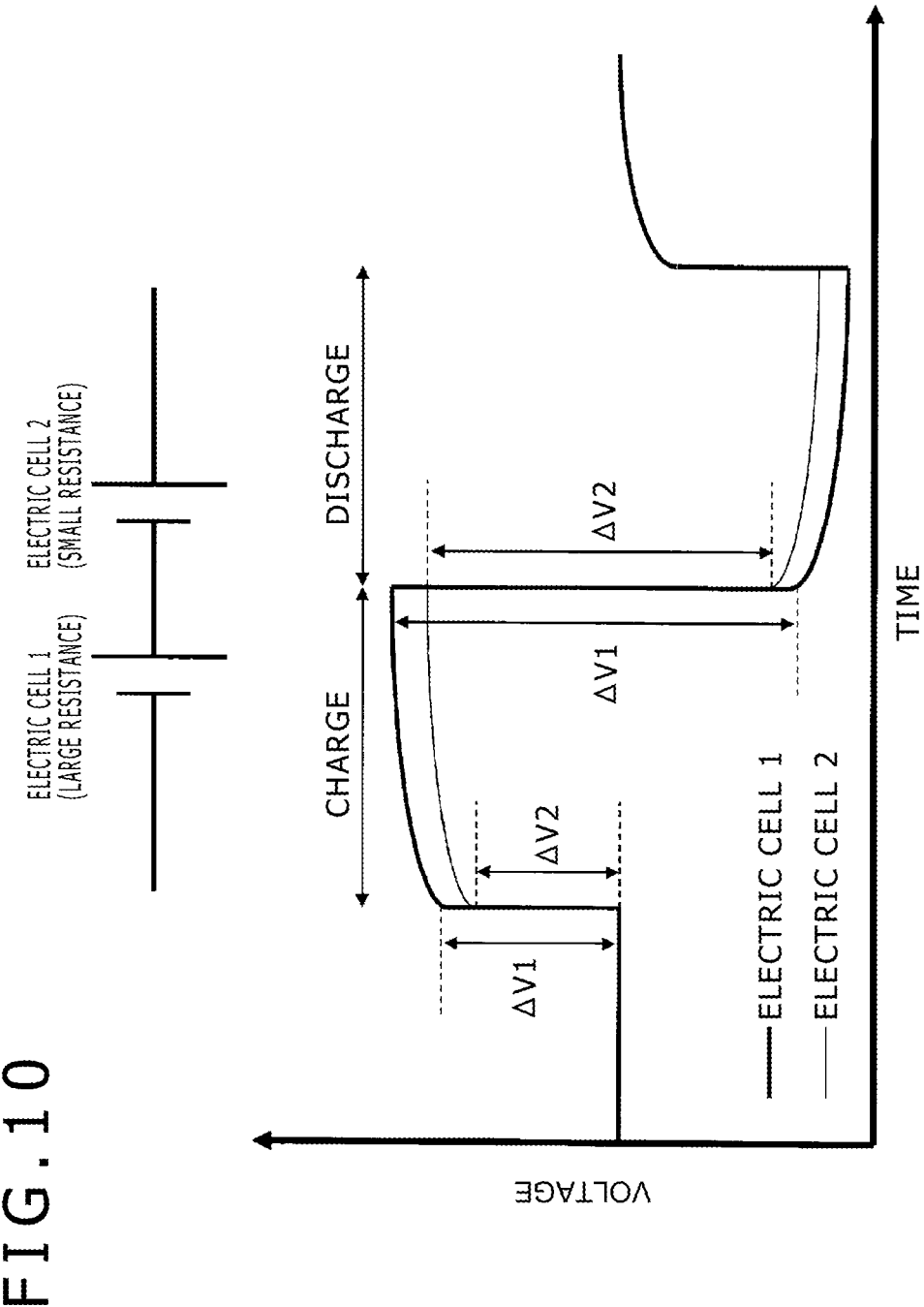
FIG. 10 is a diagram illustrating a method of detecting a change in the voltage of the electric cells connected in series.

In this case, if an individual variability is generated in the progression of deterioration of the electric cells 111 configuring the assembled battery 110, a difference occurs in the internal resistances of the respective electric cells 111. The electric cells 111 progressing in the deterioration are large in the internal resistance, and the electric cells 111 not progressing in the deterioration is smaller in the internal resistance than the electric cells 111 progressing in the deterioration. For that reason, as illustrated in FIG. 10, because a current flowing in the respective electric cells 111 connected in series is identical with each other, the individual variability of the internal resistance appears as a magnitude relationship of the above-mentioned voltage changes ($\Delta V$). That is, the electric cells 111 larger in the internal resistance is larger in $\Delta V$ whereas the electric cells 111 smaller in the internal resistance is smaller in $\Delta V$. FIG. 10 illustrates a voltage change when changing from a state in which no current flows to a state (charging state) in which the current flows, and a voltage change between before changing a flow of current (charging state) and after changing the flow of current (discharging state).

In Step S903, the resistance equalization unit 154 calculates a mean value $\Delta V$ave of $\Delta V$ of the respective electric cells 111 obtained in Expression (7). In Step S904, the electric cells 111 larger in $\Delta V$ and the electric cells 111 smaller in $\Delta V$ are specified with reference to the mean value $\Delta V$ave.

Figure 11:
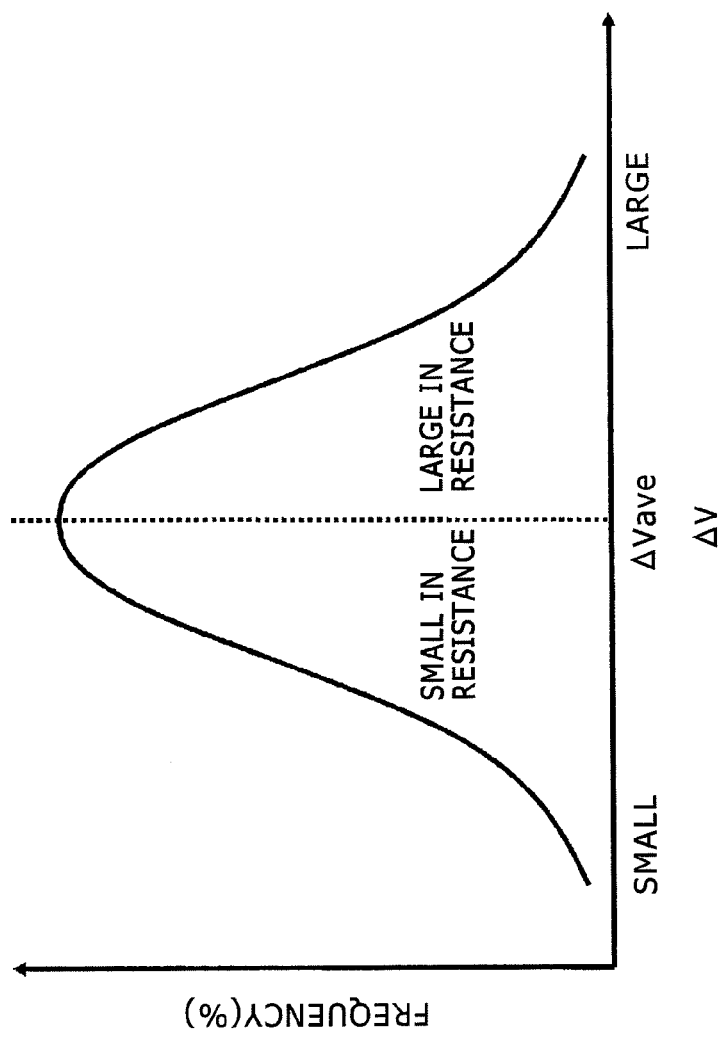
FIG. 11 is a diagram illustrating an example of a determination result of a magnitude relationship of $\Delta V$.

FIG. 11 illustrates an example of the determination results of the magnitude relationship of $\Delta V$. Centering on $\Delta V$ave, the electric cells 111 of $\Delta V$ larger than the $\Delta V$ave are classified into a group of the larger internal resistance, and the electric cells 111 of smaller $\Delta V$ are classified into a group of the smaller internal resistance.

In Step S901, it is confirmed whether the temperature of the electric cells 111 configuring the assembled battery 110 rises. This is because whether the magnitude relationship of the internal resistance illustrated in FIG. 11 is truly caused by the individual variability in the progression of deterioration is to be specified. When the temperature rising occurs due to the charge or discharge operation, there is a possibility that a temperature dispersion occurs among the electric cells 111, and the temperature dispersion contributes to the occurrence of the internal resistance difference. In this example, in order to suppress an influence of the internal resistance difference caused by the temperature dispersion, if the heating value falls within a given range, the processing subsequent to S901 is conducted.

If the magnitude of $\Delta V$ of the respective electric cells 111 is specified, and the magnitude relationship of the internal resistance is indirectly recognized by the $\Delta V$ magnitude relationship in Step S904, the resistance equalization unit 154 transmits an instruction for reducing the voltage or SOC of the electric cells 111 large in ΔV to the SOC equalization unit 153 in Step S905. The SOC equalization unit 153 that has receives the instruction changes the operation contents in the SOC equalization unit 153. That is, the resistance equalization unit 154 further transmits the instruction for reducing the voltage or SOC by a given individual variability equalization effective value illustrated in FIG. 12 to the SOC equalization unit 153, in addition to the conventional equalization control for equalizing the SOC dispersion, for the group of the electric cells 111 large in ΔV (large in the internal resistance).

Figure 12:
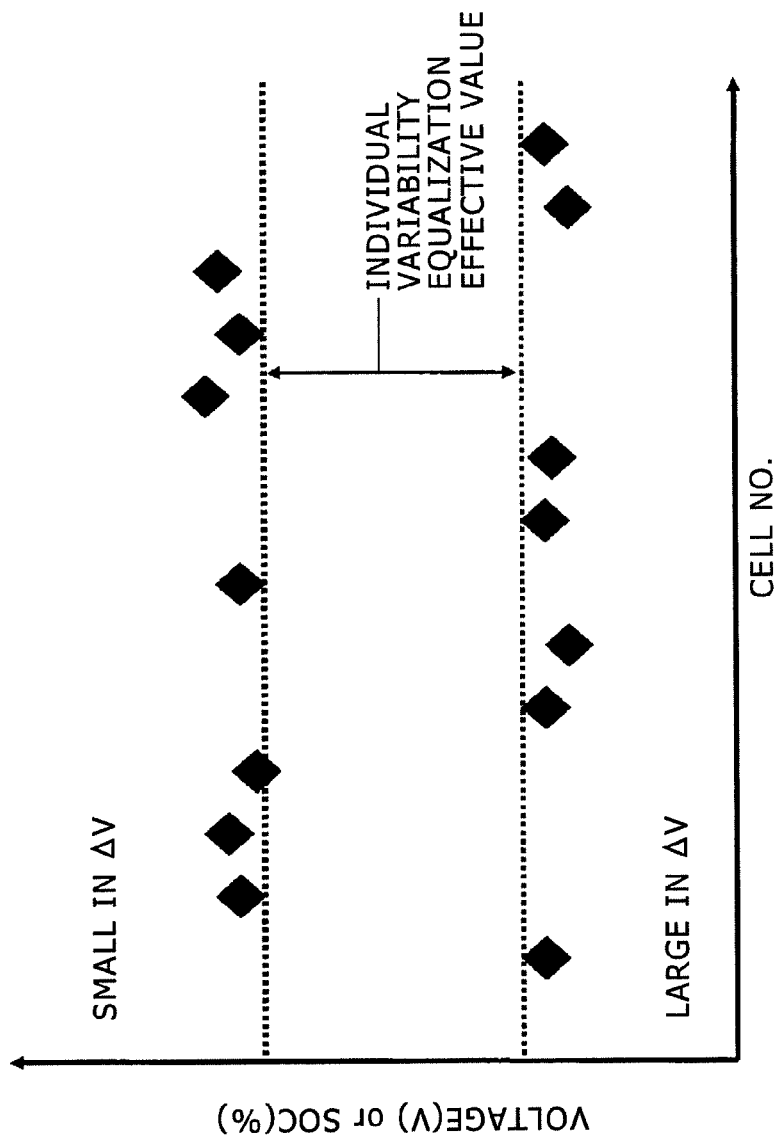
FIG. 12 is a diagram illustrating a control example of an SOC equalization unit 153 according to an instruction from a resistance equalization unit 154.

FIG. 12 illustrates a control example of the SOC equalization unit 153 according to the instruction of the resistance equalization unit 154. The operation of the SOC equalization unit 153 described with reference to FIGS. 7 and 8 represents the equalizing operation conducted up to now, which detects the SOCs of the respective electric cells 111 to obtain the minimum SOC under the condition in which the SOC dispersion is detected, and implements the equalization control so that the SOCs of all the electric cells 111 matches the minimum SOC. The equalizing operation is the operation when the above-mentioned instruction is generated from the resistance equalization unit 154.

Figure 7:
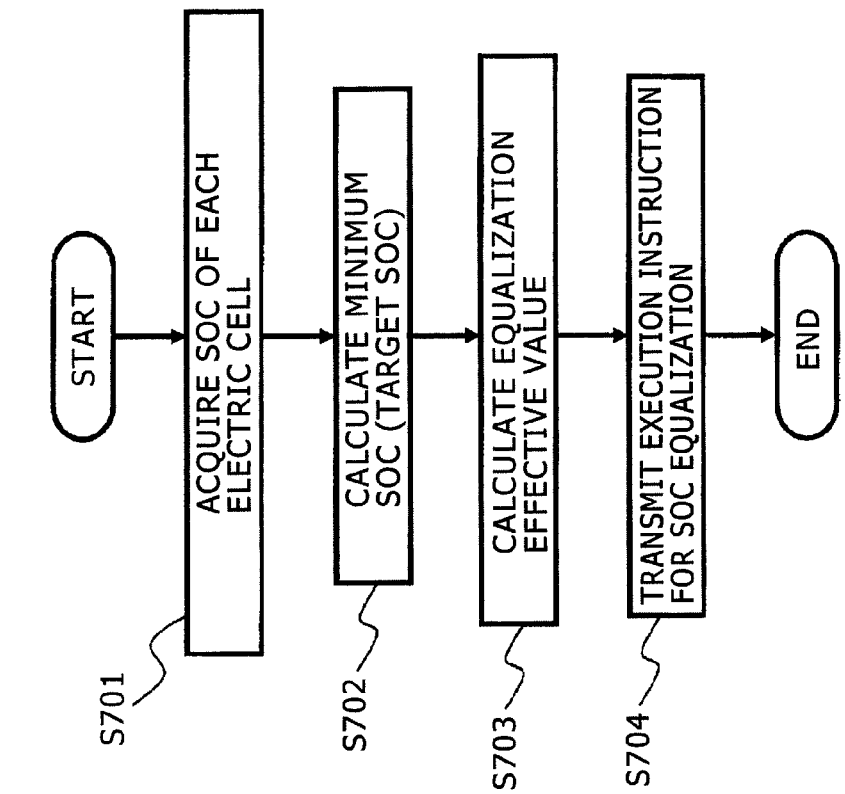
FIG. 7 is a flowchart illustrating the operation of an SOC equalization unit.

On the other hand, if there is the instruction from the resistance equalization unit 154, the SOC equalization unit 153 further discharges the electric cells 111 large in the voltage change ΔV (large in the internal resistance) in addition to the operation illustrated in FIG. 7. As a result, a state in which the voltage changes ΔV match each other as illustrated in FIG. 8 is brought into a state the voltage or SOC of the electric cells 111 grouped into the large ΔV are reduced by a given individual variability equalization effective value as compared with the electric cells 111 grouped into the small ΔV as illustrated in FIG. 12. SOC levels match each other within the group of the same ΔV by the SOC equalization.

As a result, the group of the electric cells 111 large in the internal resistance is low in the voltage or SOC, and the group of the electric cells 111 small in the internal resistance as compared with the above group leaves the assembled battery 110 in a state where the SOC becomes high, or uses the assembled battery 110. For that reason, because the electric cells 111 large in the internal resistance are always managed in a state where the deterioration of the internal resistance matches each other, the progression of deterioration is suppressed in the group of the electric cells 111 larger in the internal resistance as compared with the electric cells 111 small in the internal resistance. As a result, the assembled battery 110 can be so managed as to eliminate a difference in the internal resistance between both of those groups.

Figure 17:
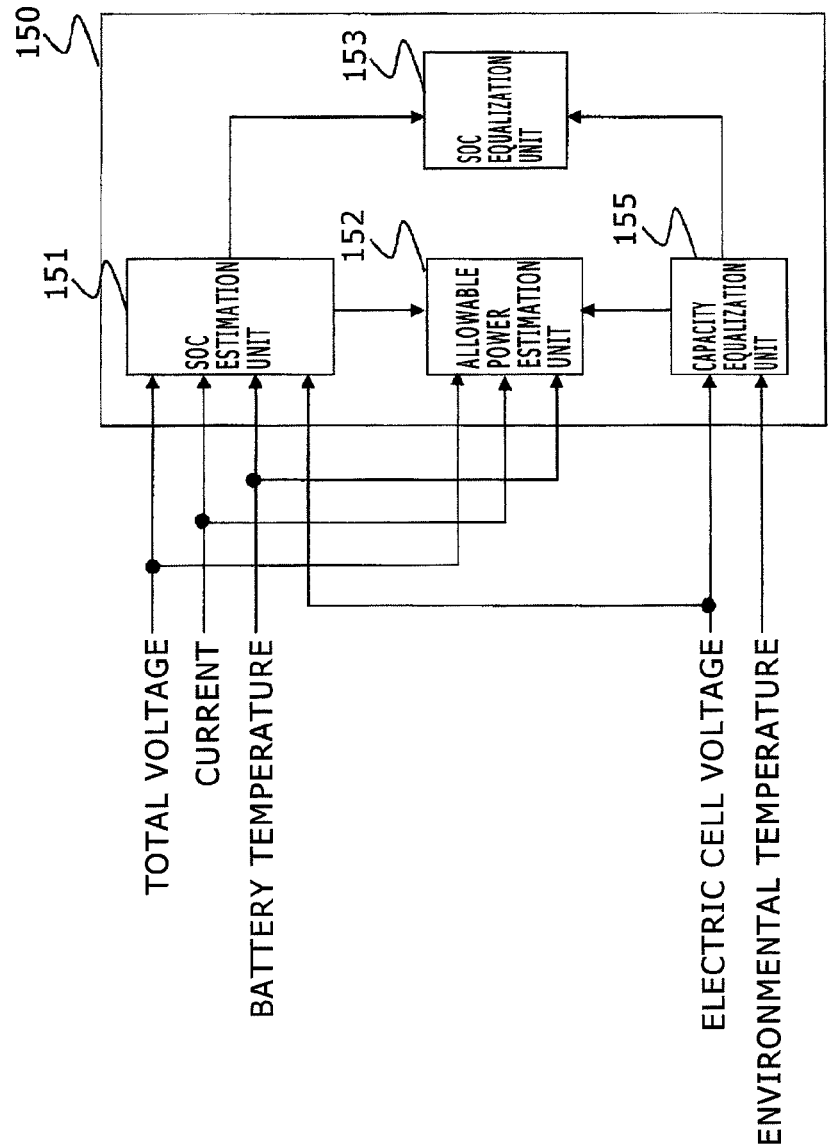
FIG. 17 is a block diagram illustrating another configuration of the assembled battery control unit 150.
Figure 27:
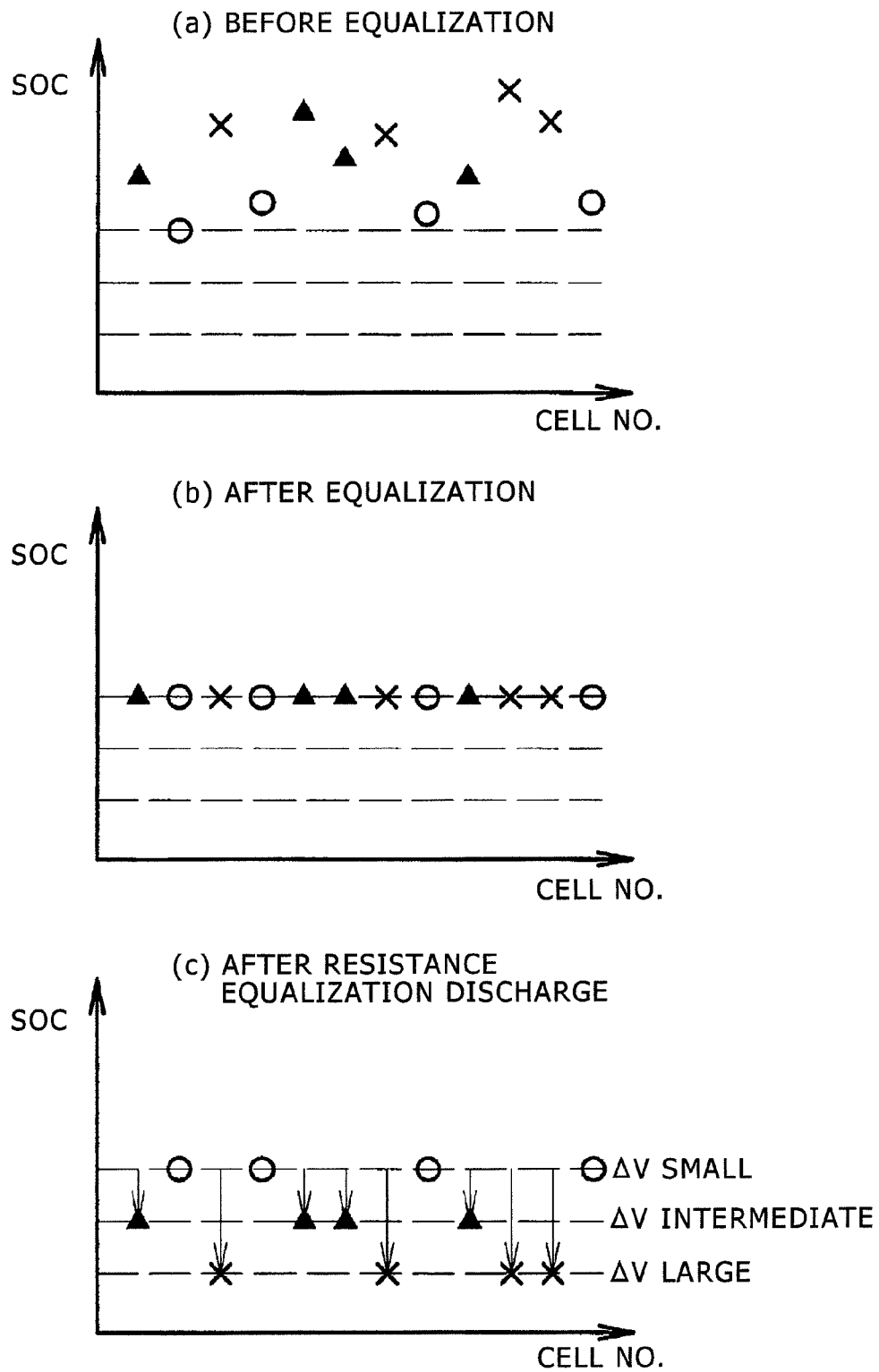
FIG. 27 is a diagram illustrating a case of dividing into three groups.

The number of grouping is not limited to two, but may be three or more. Also, the individual variability equalization effective value may be set according to the size of ΔV for each of the electric cells 111. FIG. 27 illustrates a discharge process when dividing into three groups. FIG. 17(*a*) illustrates the SOCs of the respective electric cells before equalization. It is assumed that the internal resistance is increased in the stated order of "○", "▲", and "x". FIG. 27(*b*) illustrates the SOC state after the SOC equalization, and the discharge operation is conducted so that the SOCs match the SOC of the electric cell smallest in the SOC by the SOC equalization. As a result, the SOCs of all the electric cells match each other. FIG. 27(*c*) illustrates the SOC state after the resistance equalization processing, that is, after additional discharge operation has been conducted according to the magnitude of ΔV. When the additional discharge operation is conduced according to the magnitude of ΔV of the respective electric cells without grouping, "▲" is distributed between a line small in ΔV and a line intermediate in ΔV in FIG. 27(*c*), and "x" is distributed between the line intermediate in ΔV and a line large in ΔV.

It is preferable that the individual variability equalization effective value illustrated in FIG. 12 is determined also taking the measurement precision of the voltage detector circuit 124 provided in the electric cell control unit 121 into account. For example, if the voltage or SOC is reduced with the application of the individual variability equalization effective value equal to or larger than a voltage measurement error generated according to the measurement precision, or the SOC estimation error, it can be surely determined that the voltage or SOC is reduced as compared with the others.

When the dispersion in the voltages or SOCs is generated by the resistance equalization unit 154, because the electric cells 111 high in the voltage or SOC is liable to arrive at an upper limit voltage, there is a need to reduce the allowable charging current and the allowable charging power. Conversely, because the electric cells 111 low in the voltage or SOC is liable to arrive at a lower limit voltage, there is a need to reduce the allowable discharging current and the allowable discharging power.

Under the circumstances, in Step S906, the resistance equalization unit 154 transmits a limit instruction of the allowable current and the allowable power to the allowable power estimation unit 152 so that the charge/discharge control of the assembled battery 110 can be surely implemented even if the dispersion in the voltage or SOC occurs. As the limit instruction value, an influence of the allowable current value and the allowable power value attributable to the dispersion in the voltage or SOC generated by the instruction of the resistance equalization unit 154 is obtained in advance, and the influence may be set as the limit instruction value at the time of operating the resistance equalization unit 154. The limit instruction value can be set according to a variety of states such as the temperature or the deterioration state of the electric cells 111.

Also, when the influence of the limit instruction value is intended to be reduced even only on the charging side of the assembled battery 110, the upper limit SOC or the lower limit SOC, which are determined when using the electric cells 111 or the assembled battery 110, can be changed to be low. When the influence of the limit instruction value is intended to be reduced even only on the discharging side of the assembled battery 110, the upper limit SOC or the lower limit SOC can be changed to be high contrary to the charging side. In this way, the SOC range in use of the electric cells 111 or the assembled battery 110 is changed to be low or high whereby the influence of the limit instruction value can be reduced even only on the charging or discharging side.

Figure 9:
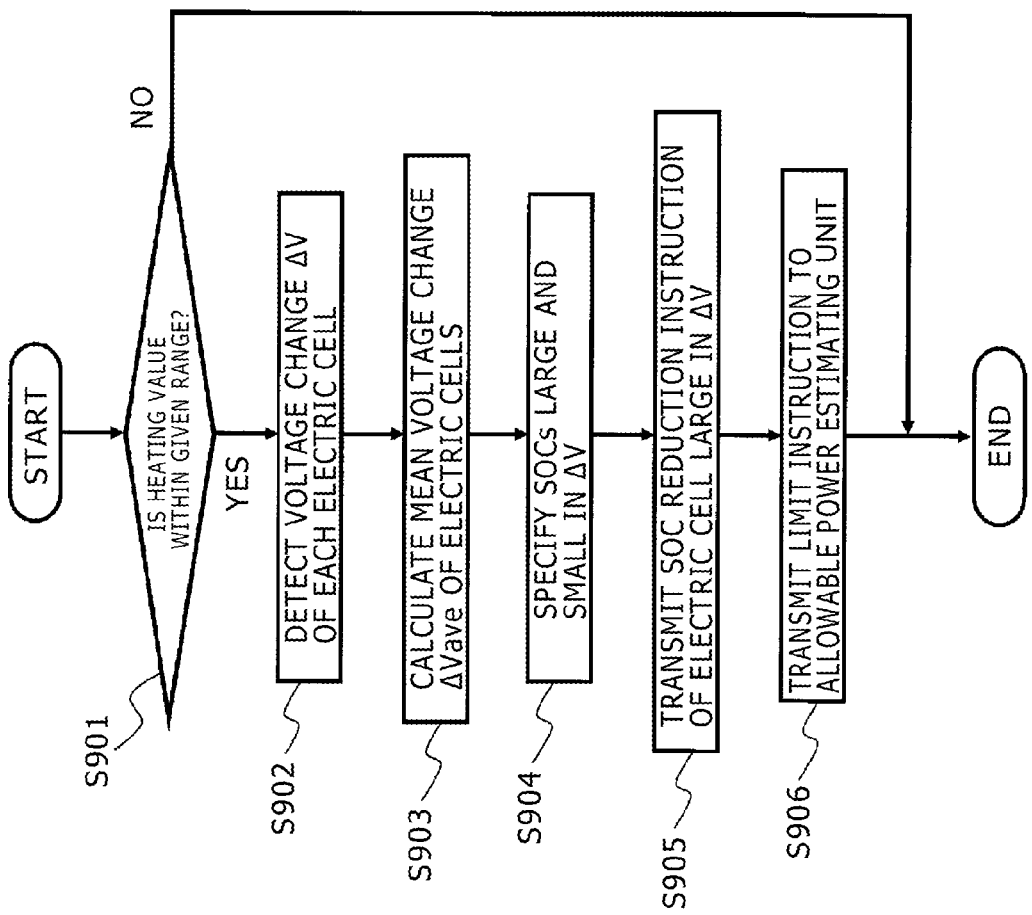
FIG. 9 is a flowchart illustrating the operation of a resistance equalization unit.

ΔV of the respective electric cells 111 is monitored on the basis of the processing contents of the resistance equalization unit 154 in FIG. 9 every time the electric cells 111 are used with the start of the electric storage device of FIG. 1. Then, when a difference in the calculated ΔV, that is, a difference in the internal resistance is reduced, and falls within an allowable range, the voltages or SOCs of one or more electric cells 111 used in a state where the voltages or SOCs are high are lowered by operating the SOC equalization unit 153 to equalize the voltages or SOCs. When a difference again occurs in ΔV, the difference in ΔV is equalized on the basis of the processing in FIG. 9.

As described above, the resistance equalization processing includes the calculation of ΔV, and the discharge process based on the calculated ΔV. In a status in which the assembled battery 110 is used, ΔV can be obtained. In order to more precisely obtain ΔV, it is preferable that ΔV is acquired when a battery state is more stable. For example, it is preferable that ΔV is acquired at the time of starting the vehicle. Also, even when the discharge process is conducted on the basis of ΔV, ΔV does not always need to be calculated in that situation. For example, there may be applied a method in which the discharge process is conducted with the use of ΔV obtained at the time of starting the vehicle, and if new ΔV is subsequently acquired, the discharge process is thereafter conducted with the acquired ΔV. Also, when the dispersion of the SOC exceeds a given amount, the SOC equalization is conducted, as a result of which the SOCs of all the electric cells 111 match each other. For that reason, when the SOC equalization is conducted, it is preferable that the discharge process is also conducted according to the instruction of the resistance equalization unit 154 together.

As described above, in this embodiment, the resistance equalization unit 154 indirectly detects a magnitude relationship of the internal resistances according to the magnitude relationship of ΔV, and determines the magnitude relationship of the SOCs of the electric cells 111 according to the magnitude relationship of ΔV. Then, the voltage or SOC is so controlled as to reduce the individual variability of the internal resistances with the use of the function of the SOC equalization unit 153. That is, the electric cells small in the internal resistance set the voltage or SOC to be high, and the electric cells large in the internal resistance set the voltage or SOC to be low. As a result, because the SOC differences corresponding to the performance differences of the plurality of electric cells 111 connected in series are allocated to the respective electric cells 111, the assembled battery 110 is held so as to always eliminate the performance differences. Therefore, the assembled battery 110 in which the deterioration states of the electric cells 111 more match each other can be realized, and the optimum management of the assembled battery 110 is facilitated.

In this embodiment, the magnitude relationship of the internal resistances is determined according to the magnitude relationship of ΔV. Alternatively, a current change ΔI is detected at a timing when ΔV is obtained, and R=ΔV/ΔI is calculated to enable the internal resistance values in the respective electric cells 111 to be obtained. With the use of the internal resistance value, the magnitude relationship of the internal resistances can be directly grasped, and the above-mentioned processing can be executed according to the magnitude of the internal resistances, likewise. There is a need to pay attention to synchronism of the current value detection and the voltage value detection.

Second Embodiment

When the electric storage device of FIG. 1 is applied to an HEV, it is general that the SOCs are managed so as to maintain a center SOC located at an intermediate position between the upper SOC that limits the charge operation and the lower SOC that limits the discharge operation. Therefore, there is a high probability that the SOCs at the time of starting and stopping the electric storage device become the center SOCs. For that reason, there is a high probability that conditions in which the SOC equalization unit 153 detects the dispersion of the SOC, and transmits the SOC equalization instruction for improving the SOC dispersion is transmitted to the electric cell control unit 121 also become the center SOC. For that reason, as illustrated in FIG. 13, this results in a high possibility that the SOCs among the electric cells 111 are most equalized in the vicinity of the center SOC. FIG. 13 illustrates an appearance in which the SOCs are changed in two electric cells 1 (large resistance) and 2 (small resistance) connected in series.

Incidentally, there is a high possibility that the electric cell 111 that is deteriorated and increases the internal resistance is also reduced in the full charging capacity, and there is a high possibility that the electric cell 111 that maintains the internal resistance also maintains the full charging capacity. Since the electric cells 111 are connected in series with each other, the current values in the charge and discharge operation are identical with each other, and a change in the SOC attributable to the charge and discharge operation in the electric cells 111 in which the full charging capacity is reduced becomes larger than that in the electric cells 111 in which the full charging capacity is maintained.

In an example illustrated in FIG. 13, the SOCs are most equalized in the vicinity of the center SOC. However, when the SOCs are changed from the center SOCs in connection with the charge and discharge operation due to the influence of the individual variability of the full charging capacities, the SOC dispersion again occurs. When the SOCs rise with reference to the center SOCs, the SOCs of the electric cells 1 (large in internal resistance) become high, and the SOCs of the electric cells 2 (small in internal resistance) become low. Conversely, when the SOCs are reduced with reference to the center SOCs, the SOCs of the electric cells 1 become low, and the SOCs of the electric cells 2 become high.

Up to now, because the SOC equalization control is executed regardless of the magnitude relationship of the internal resistances of the respective electric cells 111, there has been used the SOC management method having a high possibility that the magnitude relationship of the SOCs may be reversed with reference to the center SOCs, as illustrated in FIG. 13. Incidentally, when the individual variability occurs in the internal resistances, if the SOCs of the electric cells 111 large in the internal resistance can be controlled to be always low as compared with the SOCs of the electric cells 111 small in the internal resistance, the deterioration of the electric cells 111 large in the internal resistance can be suppressed as compared with the electric cells 111 small in the internal resistance. For that reason, the individual variability of the internal resistances among the electric cells 111 can be managed so as to be always equalized.

In the resistance equalization unit 154 according to this embodiment, in order to surely equalize the above-mentioned individual variability of the internal resistances, as illustrated in FIG. 14(a), the SOCs of the electric cells 111 large in the internal resistance are controlled to be always low values as compared with the SOCs of the electric cells 111 small in the internal resistance, within an SOC use range from the upper limit SOC to the lower limit SOC.

FIG. 14 illustrates the control of the resistance equalization unit 154 in an example in which two electric cells of the electric cell 1 and the electric cell 2 are connected in series with each other. It is assumed that the full charging capacity of the electric cell 1 is Qmax1, the full charging capacity of the electric cell 2 is Qmax2, and Qmax1<Qmax2 is satisfied. As illustrated in FIG. 14(b), it is assumed that the SOCs of the electric cells 1 and 2 which are detected when the electric storage device of FIG. 1 starts, that is, the SOCs when the charged electric quantities to the respective electric cells 1 and 2 after the electric storage device has started are 0 are SOC1a and SOC2a, respectively. Up to now, the SOC dispersion such that SOC1a is higher than SOC2a is detected, and the SOC equalization unit 153 transmits a discharge instruction only for allowing SOC1a to match SOC2a so that both of the SOCs match each other.

However, because the full charging capacities of the electric cell 1 and the electric cell 2 have a relationship of Qmax1<Qmax2, a change in the SOC when the electric cell 1 and the electric cell 2 are charged by the same electric quantity, that is, an inclination of the SOC satisfies (SOC inclination of electric cell 1)>(SOC inclination of electric cell 2). For that reason, the SOC dispersion of the electric cells 1 and 2 is more enlarged as the SOC becomes higher.

For example, in the charging quantity Q1, the SOC of the electric cell 1 arrives at the upper limit SOC, but the SOC of the electric cell 2 does not arrive at the upper limit SOC. Also, in the charging quantity Q2, the SOC of the electric cell 1 exceeds the upper limit SOC (SOC1$b$), but the SOC of the electric cell 2 arrives at the upper limit SOC (SOC2$b$). If the SOCs of the electric cells 1 and 2 can match each other by the upper limit SOC, as illustrated in FIG. 14A, the SOC of the electric cell (electric cell 1) large in the internal resistance can be managed to be always smaller than the SOC of the electric cell (electric cell 2) small in the internal resistance.

Under the circumstances, in this embodiment, when the electric storage device of FIG. 1 starts, the SOCs of the respective electric cells 111 are obtained, and the resistance equalization unit 154 transmits an instruction to the SOC equalization unit 153 so that the SOCs of the respective electric cells 111 match each other when the respective electric cells 111 are charged up to the upper limit SOC. Hereinafter, the operation of the resistance equalization unit 154 will be described in an example in which N electric cells 111 are connected in series.

First, the upper limit SOC is represented by Expression (8) with the use of the upper limit SOC set in the electric storage device of FIG. 1, or an external of the electric storage device in advance, the SOCs ((SOC1$a$, SOC2$a$, . . . , SOCN$a$) of the respective electric cells 111 which can be detected at the time of starting the electric storage device of FIG. 1, and the full charging capacities (Qmax1, Qmax2, . . . , QmaxN) of the respective electric cells 111. Q1, Q2, . . . , QN represent the charged electric quantities of the respective electric cells 111 necessary to arrive at the upper limit SOC. A value of the full charging capacities can be calculated for each of the electric cells 111 with the use of Expression (11) to be described later.

$$\text{Upper Limit } SOC = SOC1a + 100 \times Q1/Qmax1 \quad (8)$$

$$\text{Upper Limit } SOC = SOC2a + 100 \times Q2/Qmax2$$

$$\vdots$$

$$\text{Upper Limit } SOC = SOCNa + 100 \times QN/QmaxN$$

Unknown values in Expression (8) are only the charged electric quantities (Q1, Q2, . . . , QN) of the respective electric cells 111 necessary to arrive at the upper limit SOC. For that reason, the upper limit SOC, the SOCs of the respective electric cells 111 which can be detected at the time of starting the electric storage device in FIG. 1, and the full charging capacities of the respective electric cells 111 are substituted into Expression (8), to obtain the charged electric quantities Q1 to QN necessary to allow the respective electric cells 111 to arrive at the upper limit SOC. Then, as represented by Expression (9), an maximum value QM is extracted from the electric quantities. In an example illustrated in FIG. 14B, Q2 corresponds to the QM.

$$QM = \text{MAX}(Q1, Q2, \ldots, QN) \quad (9)$$

That is, if the respective electric cells 111 are charged with the electric quantity QM so that the electric cell 2 arrives at the upper limit SOC, and the electric cell 1 exceeds the upper limit SOC in the charged electric quantity Q2 of FIG. 14($b$), all of the electric cells 111 should be equal to or larger than the upper limit SOC. For that reason, if QM is substituted into the electric quantities Q1, Q2, . . . , QN of the respective electric cells 111 in Expression (8), the SOCs of all the other electric cells 111 when the electric cell 111 lowest in the SOC arrives at the upper limit SOC can be predicted.

The resistance equalization unit 154 conducts the above-mentioned prediction, and transmits discharge quantities corresponding to differences between the predicted SOCs of the respective electric cells 111 and the minimum SOC of the predicted SOCs to the SOC equalization unit 153 as a discharge instruction. In an example illustrated in FIG. 14B, the discharge quantity corresponding to SOC1$b$-SOC2$b$ is transmitted as a discharge instruction for the electric cell 1, that is, so that a line for the electric cell 1 and a line for the electric cell 2 match each other at the charged electric quantity=Q2.

In this way, in this embodiment, even when the electric cells 111 provided in the electric storage device of FIG. 1 starts in the vicinity of the center SOC, the SOC equalization control can be executed so as to eliminate the SOC dispersion expected when arriving at the upper limit SOC. For that reason, as illustrated in FIG. 14($a$), the SOCs (voltages) of the electric cells 111 large in the internal resistance (small in the full charging capacity) can be managed to be always low within the SOC use range from the upper limit SOC to the lower limit SOC as compared with the electric cells 111 small in the internal resistance (large in the full charging capacity). As a result, the progression of deterioration of the electric cells 111 large in the internal resistance is suppressed as compared with the electric cells 111 small in the internal resistance so as to equalize the individual variability of the internal resistances of the electric cells 111 configuring the assembled battery 110.

Third Embodiment

Figure 15:
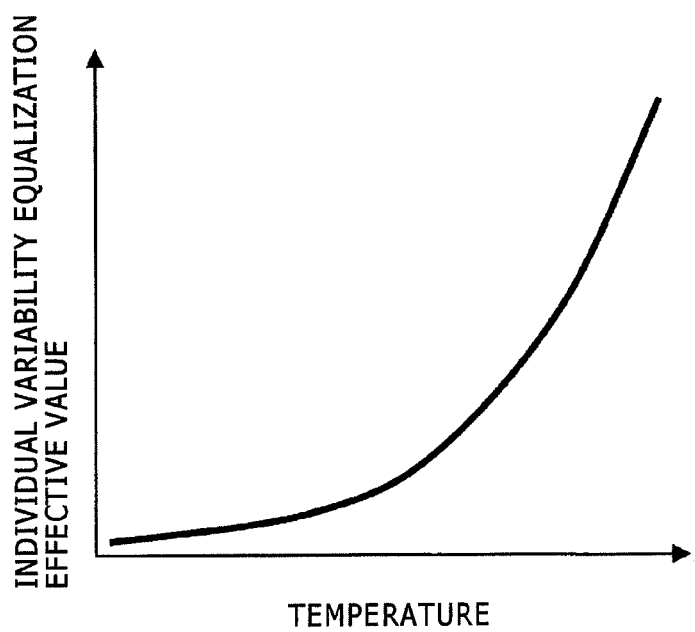
FIG. 15 is a diagram illustrating an individual variability equalization effective value in the vicinity of SOC 50%.

FIGS. 15 and 16 are diagrams illustrating the operation of the resistance equalization unit 154 according to a third embodiment. FIG. 16 illustrates the electric cells 1 and 2 connected in series as in FIGS. 13 and 14. The electric cell 1 is large in the internal resistance, and the electric cell 2 is small in the internal resistance. In the processing of Step S906 illustrated in FIG. 9, the resistance equalization unit 154 transmits a limit instruction to the allowable power estimation unit 152 in correspondence with the voltage or SOC dispersion generated to equalize the individual variability of the internal resistance.

As illustrated in FIG. 6, Rz of the electric cells 111 is changed according to a temperature, Rz is large at a room temperature, and Rz is small at a high temperature. With this configuration, the allowable current value and the allowable power value calculated with the use of Rz tend to become small at a low temperature and large at a high temperature as in Expressions (3), (4), (5), and (6). At low temperature at which the allowable current value and the allowable power value become small, the limit instructions of the allowable current value and the allowable power value by the above-mentioned resistance equalization unit 154 further reduce the allowable current value and the allowable power value. For that reason, an influence of the limit instruction on the assembled battery 110 performance is large. On the other hand, because a sufficient input/output performance can be ensured at a high temperature side, the influence of the limit instruction becomes small.

Taking the above fact into consideration, according to the third embodiment, the individual variability equalization effective value used by the resistance equalization unit 154 is implemented as a function or map corresponding to the temperature. FIG. 15 illustrates a change in the individual variability equalization effective value according to the temperature. As described above, taking a fact that the allowable current value and the allowable power value are more increased as the temperature becomes higher, to reduce the above-mentioned influence of the increase in the limit value into consideration, the individual variability equalization effective value is increased according to an increase in the temperature. This makes it possible to realize the battery management device that can equalize the resistance individual variability taking a change in the performance according to the temperature of the assembled battery 110 into consideration. When the temperature is set as an environmental temperature, a temperature of the electric cells 111 immediately after the electric storage device of FIG. 1 stops for a long time, and then restarts can be used as a substitute for the environmental temperature.

Also, the processing contents of the resistance equalization unit 154 according to the temperature can be realized with the change of the operation contents of the resistance equalization unit 154 described in the second embodiment. That is, in the second embodiment, the resistance equalization unit 154 transmits the instruction to the SOC equalization unit 153 so as to equalize the SOCs among the electric cells 111 at the upper limit SOC. On the other hand, in this embodiment, the resistance equalization unit 154 transmits the instruction to the SOC equalization unit 153 so as to equalize the SOCs at the upper limit SOC at a high temperature, and transmits the instruction to the SOC equalization unit 153 so as to equalize the SOC at the center SOC as the temperature becomes lower (refer to FIGS. 16(a) to 16(c)).

Specifically, the upper limit SOC on a left side of Expression (8) is replaced with a function (equalized SOC (temperature)) that changes from the upper limit SOC to the center SOC according to the temperature as represented by the following Expression (10), to thereby change the most equalized SOC condition according to the temperature.

$$\text{Equalized } SOC \text{ (temperature)} = SOC1a + 100 \times Q1/Q\text{max}1 \quad (10)$$

$$\text{Equalized } SOC \text{ (temperature)} = SOC2a + 100 \times Q2/Q\text{max}2$$

$$\vdots$$

$$\text{Equalized } SOC \text{ (temperature)} = SOCNa + 100 \times QN/Q\text{max}N$$

Then, the resistance equalization unit 154 obtains the electric quantities Q1, Q2, . . . , QN that arrive at the equalized SOCs (temperature) of the respective electric cells 111 from Expression (10). Further, the resistance equalization unit 154 obtains the a maximum charging quantity QM by Expression (9), and transmits an instruction to the SOC equalization unit 153 so that the SOCs most match each other at the designated equalized SOC (temperature). As illustrated in FIG. 16(a), because the SOC dispersion by the resistance equalization unit 154 is not generated at a low temperature, there is no limit amount to the allowable power estimation unit 152 by the resistance equalization unit 154, and the input/output performance of the assembled battery 110 is not degraded.

As described above, in this embodiment, the SOC dispersion generation quantity by the resistance equalization unit 154 can be changed according to the temperature of the electric cells 111, and the input/output performance of the assembled battery 110 can be prevented from being degraded as much as possible. As a result, the battery management small in the influence on the input/output performance of the assembled battery 110 can be conducted while equalizing the individual variability of the internal resistances of the electric cells 111 configuring the assembled battery 110.

Fourth Embodiment

As illustrated in FIG. 17, the assembled battery control unit 150 according to this embodiment is equipped with a capacity equalization unit 155 instead of the resistance equalization unit 154 as illustrated in FIG. 17. The configurations other than the capacity equalization unit 155 are identical with those of the assembled battery control unit 150 in FIG. 3. The capacity equalization unit 155 detects a difference in the full charging capacity among the electric cells, and operates the SOC equalization unit 153 in order to equalize the capacity difference.

Figure 18:
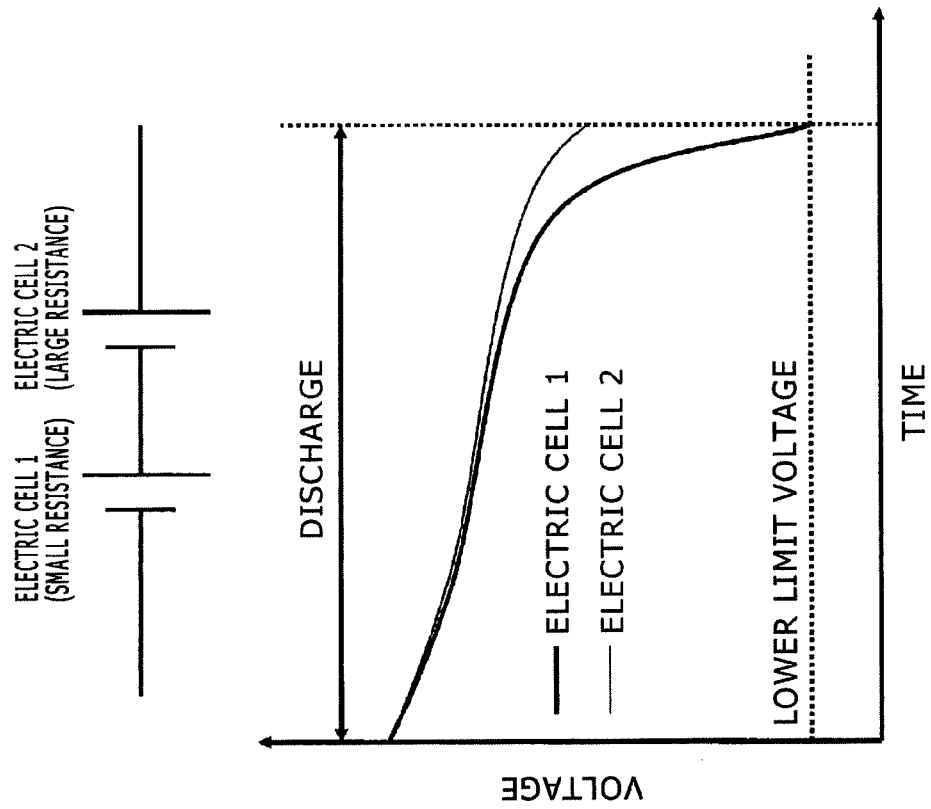
FIG. 18 is a diagram illustrating an influence caused when the individual variability of the full charging capacities occurs in the electric cells.

FIG. 18 illustrates a voltage change during the discharge operation when the electric cell 1 and the electric cell 2, which are different in the full charging capacity, are connected in series with each other. Even when the same electric quantity is emitted, a voltage drop of the electric cell 1 (small in the full charging capacity) is larger than a voltage drop of the electric cell 2 (large in the full charging capacity). The capacity equalization unit 155 grasps a magnitude relationship of the full charging capacities of the plurality of electric cells 111 connected in series with each other on the basis of a difference in the voltage drop when the same electric quantity is emitted. That is, it is determined that the electric cells 111 (electric cell 1) largely reduced in the voltage are small in the full charging capacity, and the electric cells 111 (electric cell 2) small reduced in the voltage are large in the full charging capacity.

Figure 19:
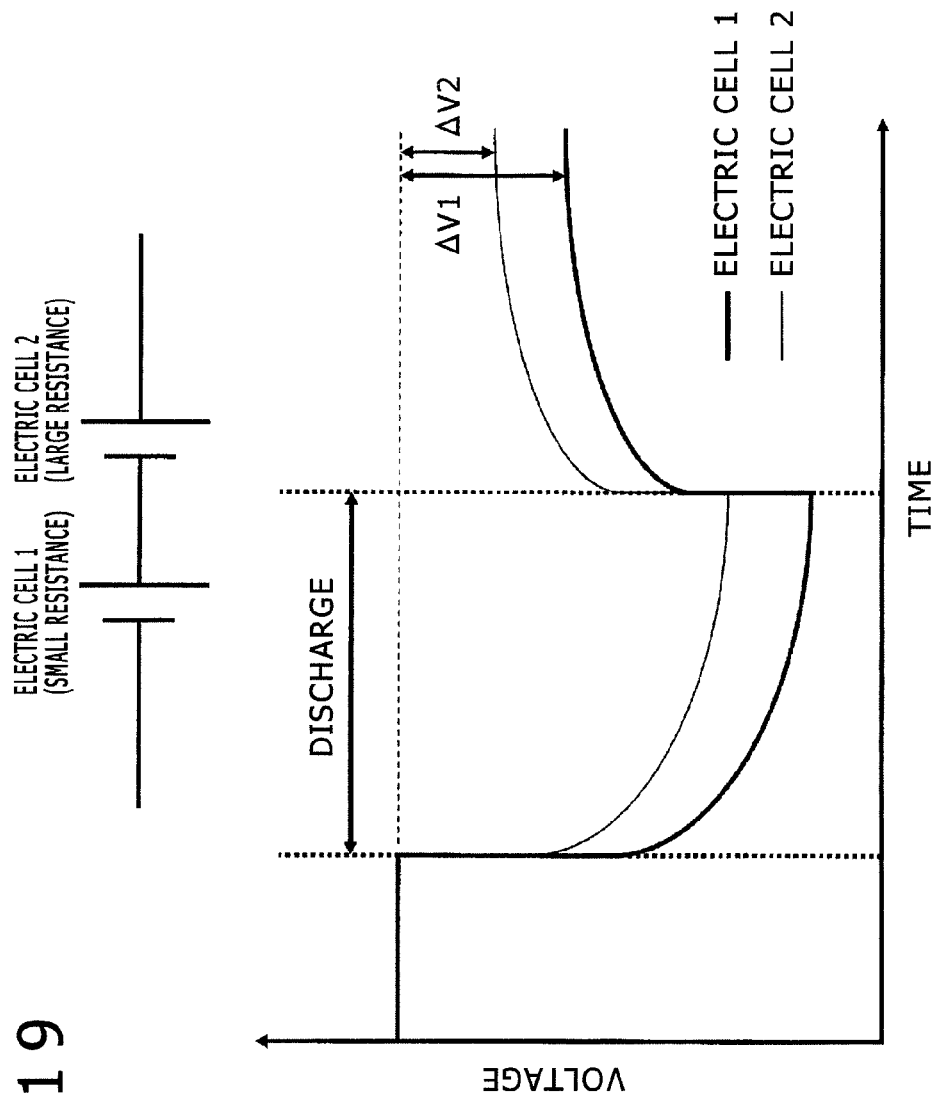
FIG. 19 is a diagram illustrating a method of detecting a change in the voltage of a plurality of electric cells.

Incidentally, the magnitude relationship of the full charging capacities may be grasped due to a difference in the voltage drop during the discharge operation as illustrated in FIG. 18. A difference in the voltage during the discharge operation is caused by an influence of other factors such as a difference in the internal resistance among the electric cells 111. Under the circumstances, in order to more surely grasp the magnitude relationship of the full charging capacities, voltage differences ($\Delta V1$, $\Delta V2$) illustrated in FIG. 19 may be used. That is, it is assumed that a difference between a voltage (OCV) before the electric cells 111 are discharged (or charged), and a voltage (OCV) after the electric cells 111 have been discharged (or charged) is $\Delta V$, and the magnitude relationship of the $\Delta V$ has a correlation with the magnitude relationship of the full charging capacities.

Specifically, the voltages across electric cells 111 are detected before the electric storage device of FIG. 1 starts, and the relays 201 or 202 are closed. Then, after the relays 201 or 202 have been closed to charge or discharge the assembled battery 110, the relays 201 or 202 are opened, and the voltages across the electric cells 111 are again detected after a time for eliminating the polarization voltage Vp illustrated in FIG. 4 has been elapsed. Because the influence of the difference in the internal resistance is not included in the voltage difference obtained from the voltages across those two electric cells 111, the capacity equalization unit 155 can more surely grasp the magnitude relationship of the full charging capacities. As another method for allowing the capacity equalization unit 155 to grasp the magnitude relationship of the full charging capacities, an SOC difference between the SOC before the charge and discharge operation and the SOC after the charge and discharge operation may be used.

Figure 20:
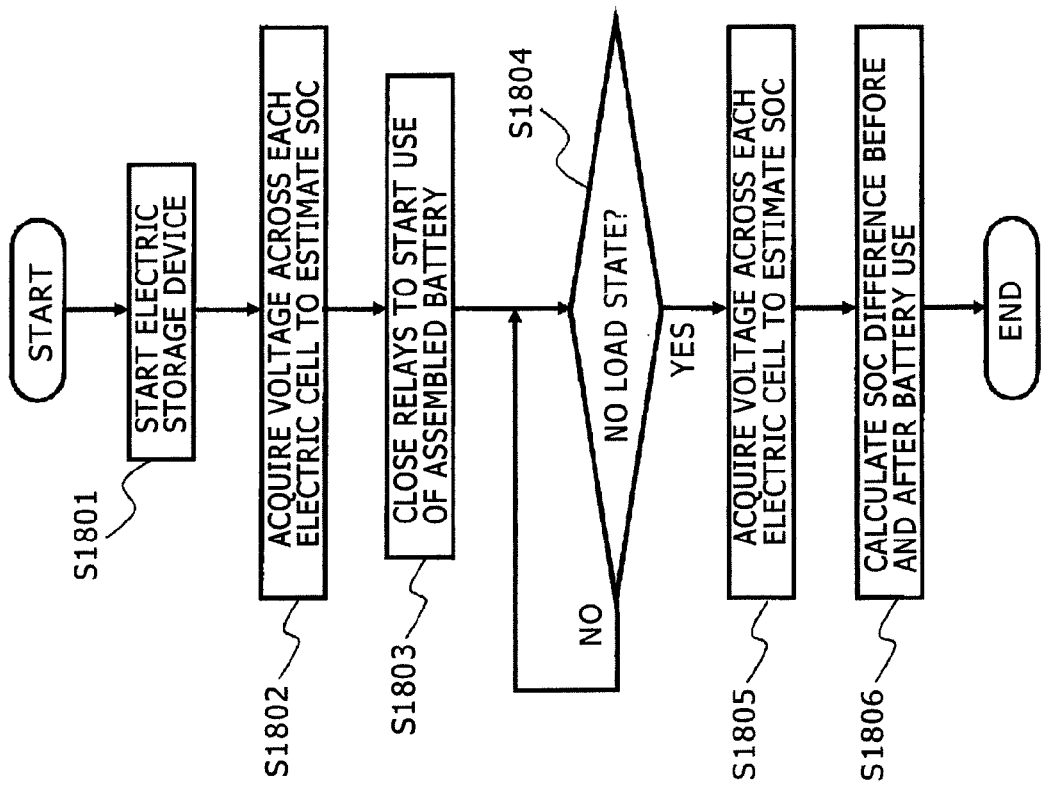
FIG. 20 is a flowchart illustrating a detection procedure of an SOC difference for grasping a magnitude relationship of the full charging capacities, which is conducted by a capacity equalization unit 155.

FIG. 20 illustrates a detection procedure of an SOC difference for grasping the magnitude relationship of the full charging capacities, which is conducted by the capacity equalization unit 155. First, in Step S1801, the electric storage device of FIG. 1 starts. In Step S1802, the voltages across the respective electric cells 111 are acquired before the relays 201 or 202 are closed, and the SOCs are estimated from the voltages (OCV) across the respective electric cells 111 on the relationship of FIG. 5. In Step S1803, the relays 201 or 202 are closed to use the assembled battery 110. That is, the assembled battery 110 is charged and discharged.

In Step S1804, it is determined whether the assembled battery 110 is in an unload state. For example, when the relays 201 or 202 are again opened, desirably when the relays 201 or 202 are again opened, and a time sufficient to eliminate the polarization voltage Vp is detected, or when the assembled battery 110 is determined as no load, and charged or discharged with a permissible fine current, it is determined that the assembled battery 110 is in the unload state. When it is determined that the assembled battery 110 is in the unloaded state in Step S1804, the flow proceeds to Step S1805, and the voltages across the respective electric cells 111 are again acquired to estimate the SOCs from the voltages across the respective electric cells 111 on the basis of the relationship of FIG. 5. In Step S1806, the SOC differences between the SOCs detected in Step S1802 and the SOCs acquired in Step S1805 are calculated. The magnitude relationship of the SOC differences is regarded as the magnitude relationship of the full charging capacities.

The capacity equalization unit 155 indirectly grasps the magnitude relationship of the full charging capacities on the basis of the voltage differences or the SOC differences. Alternatively, the capacity equalization unit 155 may directly grasp the magnitude relationship of the full charging capacities as follows. That is, the full charging capacities (Qmax1, Qmax2, . . . , QmaxN) of the respective electric cells 111 are obtained as represented by Expression (11) on the basis of an integral value ($\int Idt$) of currents calculated during use (during charging or discharging) of the assembled battery 110, and the SOC differences ($\Delta SOC1, \Delta SOC2, \ldots, \Delta SOCN$) obtained for each of the electric cells 111 during the use of the assembled battery 110. The full charging capacities thus obtained are compared with each other to directly grasp the magnitude relationship of the full charging capacities.

$$Qmax1 = 100 \times \int Idt/\Delta SOC1 \quad (11)$$

$$Qmax2 = 100 \times \int Idt/\Delta SOC2$$

$$\vdots$$

$$QmaxN = 100 \times \int Idt/\Delta SOCN$$

The capacity equalization unit 155 determines the magnitude relationship of the full charging capacities by comparing the above-mentioned $\Delta V$, or $\Delta SOC$, or Qmax. FIG. 21(a) illustrates an example in which the magnitude relationship of the full charging capacities is determined by $\Delta SOC$, and FIG. 21(b) is a diagram illustrating the operation of the SOC equalization unit 153 which is conducted after the determination. In FIG. 21 (a), the electric cells 111 having the $\Delta SOC$ larger than the means $\Delta SOC$ are determined as the small full charging capacities, and the electric cells 111 having the $\Delta SOC$ smaller than the means $\Delta SOC$ are determined as the large full charging capacities. The same is applied to a case in which $\Delta V$ is compared to determine the magnitude relationship of the full charging capacities.

As another determination method, a minimum value and a maximum value of the $\Delta SOC$ are detected, and a range between the minimum value and the maximum value is divided by an arbitrary number into groups, and it can be determined that the capacity of the electric cells 111 is smaller as the group to which the electric cells 111 belong is closer to the maximum value. This grouping can be applied to a case of FIG. 11. Further, the capacity magnitude may be determined for each of the electric cells 111 without grouping to set the equalization effective value.

The capacity equalization unit 155 transmits, to the SOC equalization unit 153, an instruction for making the voltages or SOCs of the electric cells 111 (large in $\Delta SOC$) determined to be small in the capacity illustrated in FIG. 21(a) smaller than the voltages or SOCs of the electric cells 111 (small in $\Delta SOC$) determined to be large in the capacity. The SOC equalization unit 153 operates for the purpose of allowing the voltages or SOCs among the electric cells 111 to match each other. When the SOC equalization unit 153 receives the instruction from the capacity equalization unit 155, the SOC equalization unit 153 adds an effective value (a given time for additionally turning on the bypass switches 123, etc.) adding only the electric cells 111 determined to be small in the capacity to the effective value (a time for turning on the bypass switches 123, etc.) which enables the voltages or SOCs to match each other.

Through the above-mentioned operation, the voltage or SOC dispersion is realized according to the magnitude relationship of the capacities in FIG. 21(b). When the relationship of the voltages or SOCs in FIG. 21 (b) continues to be maintained, the electric cells 111 small in $\Delta SOC$ (large in the full charging capacities) are large in the progression of deterioration as compared with the electric cells 111 large in $\Delta SOC$ (small in the full charging capacities). As a result, the assembled battery 110 can be managed so that the capacity differences among the electric cells 111 are equalized.

When the electric storage device of FIG. 1 is used as a PHEV or an EV, the assembled battery 110 is connected to the charger 205 through the relays 202, and the assembled battery 110 is charged up to the vicinity of the full charge by the charger 205. Because the assembled battery 110 is left with the high SOCs close to the full charge until the vehicle starts moving, the voltage or SOC dispersion among the electric cells 111 by the above-mentioned capacity equalization unit 155 is executed in this situation, as a result of which the equalization effect of the capacities can be obtained while the vehicle is being left.

Under the circumstances, the SOC equalization unit 153 implements the SOC equalization processing of FIG. 7 at the time of the high SOC after the assembled battery 110 has been charged, or at the time of the high SOC after the assembled battery 110 has been charged before the vehicle moves, and conducts the equalization control so that the voltages or SOCs among the electric cells 111 match each other at the time of the high SOC. Further, the capacity equalization unit 155 transmits an instruction to the SOC equalization unit 153 so that the electric cells 111 large in $\Delta SOC$ (small in the full charging capacities) are distributed with the lower voltage or SOC than the electric cells 111 small in $\Delta SOC$ (large in the full charging capacities). Because the positional relationship of the voltages or SOCs as illustrated in FIG. 21(b) can be realized at the time of the high SOC with the above operation, the effect of the capacity equalization can be expected during a left period.

In the above description, the SOC equalization unit 153 executes the processing contents of FIG. 7 in the vicinity of the high SOC, and transmits the instruction corresponding to the magnitude relationship of the full charging capacities, which is transmitted by the capacity equalization unit 155, to the SOC equalization unit 153, to thereby realize the positional relationship of the voltages or SOCs illustrated in FIG. 21(b). However, even under a status in which the present SOC at the time of starting the electric storage device of FIG. 1 is the center SOC or the lower limit SOC other than the upper limit SOC, the capacity equalization unit 155 may predict the SOC dispersion when arriving at the upper limit SOC with the use of Expressions (8) and (9), and obtain the effective value (on-time of the bypass switches 123, etc.) for most equalizing the SOCs at the upper limit SOC on the basis of the predicted SOC dispersion. Then, the capacity equalization unit 155 may correct the effective value so that the electric cells 111 large in ΔSOC (small in the full charging capacities) becomes small in the SOC as compared with the electric cells 111 small in ΔSOC (large in the full charging capacities), and transmit the corrected effective value to the SOC equalization unit 153.

The SOC equalization unit 153 operates the bypass switches 123 of the electric cell control unit 121 with the use of the effective value corrected by the capacity equalization unit 155 so as to realize the positional relationship of the voltages or SOCs in FIG. 21 (b) in the vicinity of the high SOC. With the above configuration, even in a state where the processing in FIG. 7 cannot be executed at the high SOC such as the vicinity of the full charge, for example, even in a state where the electric storage device of FIG. 1 frequently starts at the center SOC or the low SOC, the positional relationship of the voltage or SOC as illustrated in FIG. 21(b) can be realized when arriving at the high SOC.

FIG. 22 illustrates an SOC management method when the voltage or SOC dispersion is generated among the electric cells 111 with a given effective value in order to equalize the full charging capacities. FIG. 22 illustrates the electric cells 1 and 2 connected in series with each other as in the case of FIGS. 13 and 14. The electric cell 1 is small in the full charging capacity, and the electric cell 2 is large in the full charging capacity. In the PHEV or the EV, the assembled battery 110 is charged up to the vicinity of the full charge by the charger 205.

In FIG. 22(a), the charge control is conducted so that the electric cells 111 low in the voltage or SOC (electric cells large in ΔSOC, that is, small in the full charging capacity) after the voltages or SOCs have been dispersed by the given effective value match the upper limit SOC during the charge operation. In this charge control, because the electric cells 111 high in the voltage or SOC (the electric cells small in ΔSOC, that is, large in the full charging capacity are used beyond the upper limit SOC, the deterioration is accelerated more than a normal use not exceeding the upper limit SOC, as a result of which the individual variability of the full charging capacities among the electric cells is equalized.

On the other hand, FIG. 22 (b) illustrates a case in which there is applied the charge control that conducts the charge operation until the mean SOC of the electric cells 111 in which the voltages or SOCs are arranged to be low, and the electric cells 111 in which the voltages or SOCs are arranged to be high arrives at the upper limit SOC. In this case, the degree by which the electric cells 111 in which the voltages or SOCs are arranged to be high exceed the upper limit SOC is smaller than that in the case of FIG. 22(a), and the progression of deterioration is slower than that in the case of FIG. 22(a). For that reason, because the electric cells 111 in which the voltages or SOCs are arranged to be low are not charged up to the upper limit SOC, the progression of deterioration is slightly difficult, as a result of which the individual variability of the full charging capacities is equalized.

In the case of FIG. 22(c), the charge control is conducted so that the electric cells 111 in which the voltages or SOCs are arranged to be high arrive at the upper limit SOC, and the electric cells 111 in which the voltages or SOCs are arranged to be low largely fall below the upper limit SOC. In this case, the electric cells 111 in which voltages or SOCs are arranged to be low are suppressed in the deterioration more than the normal electric cells, as a result of which the individual variability of the full charging capacities is equalized.

In comparison of FIGS. 22 (a), 22 (b), and 22 (c), a common effect is obtained in equalizing the individual variability of the full charging capacities, but the lifetime and capacity performance of the assembled battery 110 are slightly different.

For example, as illustrated in FIG. 22 (a), the electric cells 111 in which the voltages or SOCs are arranged to be high are accelerated in the deterioration, and the electric cells 111 in which the voltages or SOCs are arranged to be low are deteriorated as usual. As a result, the lifetime is managed to be shortened in a comprehensive manner. However, because the electric cells 111 that are small in the full charging capacity, and in which the voltages or SOCs are arranged to be relatively low are charged up to the upper limit SOC to use the assembled battery 110, the capacity performance is excellent as compared with the other cases.

In FIG. 22(b), the means value of the electric cells 111 in which the voltages or SOCs are arranged to be high, and the electric cells 111 in which the voltages or SOCs are arranged to be low is set as the upper limit voltage or SOC during the charge operation. For that reason, the electric cells 111 in which the voltages or SOCs are arranged to be high are slightly accelerated in the deterioration, and the electric cells 111 in which the voltages or SOCs are arranged to be low are slight suppressed in the deterioration. For that reason, the lifetime is excellent, but the capacity performance is inferior, as compared with the case of FIG. 22(a).

In the case of FIG. 22(c), the electric cells 111 that are large in the full charging capacity, and in which the voltages or SOCs are arranged to be high are charged up to the upper limit SOC to use the assembled battery 110. For that reason, the electric cells 111 large in the full charging capacity are progressed in the deterioration as usual, and the electric cells 111 in which the voltages or SOCs are arranged to be low, and the full charging capacities are small are suppressed in the deterioration. In this case, because the individual variability of the full charging capacities is equalized by the deterioration suppression effect of the electric cells 111 small in the full charging capacity, the lifetime performance is most superior. On the other hand, because of the use method where the electric cells 111 in which the voltages or SOCs are arranged to be low, and the full charging capacities are small are not charged up to the upper limit SOC, this method is inferior in the capacity performance to the other examples.

As how to select the above three types of management methods, for example, when the capacity of the assembled battery 110 is to be ensured for the purpose of conducting EV travel far, the method of FIG. 22 (a) is employed. Also, when the capacity of the assembled battery 110 is not emphasized for the purpose of conducting the EV travel near, the method of FIG. 22(c) is employed, and the lifetime performance of the assembled battery 110 is enhanced as much. In this way, it is preferable that the management method is switchable according to how to use the assembled battery 110. The switching method is realized by provision of a changeover switch on a screen of a car navigation system, or otherwise at an arbitrary place within a vehicle interior.

Also, when the assembled battery 110 is frequently used in a state where the assembled battery 110 is not completely charged, an influence of the voltage or SOC dispersion on the capacity performance of the assembled battery 110 is large. In this case, when the frequent use in a state where the SOC is not too high is detected, the above influence can be eliminated by reducing the effective values for dispersing the voltages or SOCs.

Further, in the electric cells 111 configuring the assembled battery 110, the capacity performance is reduced at a low temperature, and the capacity performance is improved at a high temperature. The influence of the capacity performance on the assembled battery 110 by dispersing the voltages or SOCs with the above arbitrary effective values is large particularly at the low temperature. In this case, the above problem can be solved by making the effective values for dispersing the voltages or SOCs variable according to the environmental temperature at which the assembled battery 110 is placed.

Figure 23:
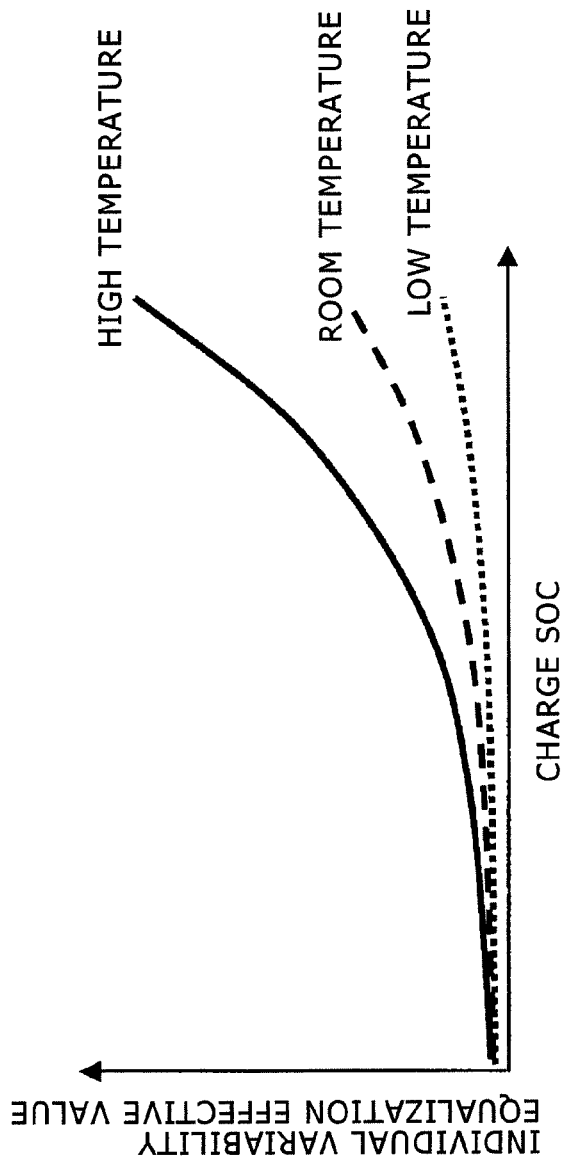
FIG. 23 is a diagram illustrating a change in the individual variability equalization effective value according to a charging SOC.

FIG. 23 illustrates an example of the effective values of the voltage or SOC dispersion for equalizing the full charging capacities. In this example, the effective values are changed according to the SOCs achieved by charging, or the environmental temperature. For that reason, the assembled battery 110 can be managed by equalizing the full charging capacities among the electric cells 111 without reducing the capacity performance of the assembled battery 110 as much as possible.

FIG. 24 is a diagram illustrating another example of switching the processing contents of the capacity equalization unit 155 according to the SOCs achieved in the charge operation. When the electric storage device of FIG. 1 is used particularly for the EV, there are conceivable a case in which the assembled battery 110 is charged with a relatively large current called "rapid charge" (FIG. 24($a$)), and a case in which the assembled battery 110 is charged with a relatively small current such as a domestic power supply (FIG. 24($b$)). In the rapid charge, there is a high possibility that the SOC value becomes low as compared with the SOC achieved with being charged by the domestic power supply. On the other hand, when the assembled battery 110 is charged with the relative small current such as the domestic power supply, there is a high possibility that the assembled battery 110 is charged up to an upper limit.

The capacity equalization unit 155 is provided with a first threshold value set to be higher than the SOC achieved by the rapid charge, and when the SOC exceeds the first threshold value, it is determined that the assembled battery 110 is charged up to the upper limit. Then, the capacity equalization unit 155 transmits an instruction to the SOC equalization unit 153 so as to generate the above-mentioned voltage or SOC dispersion. When the assembled battery 110 is charged up to the upper limit, the SOC then arrives at a second threshold value, and the charge of the assembled battery 110 has been completed. On the other hand, FIG. 24 ($a$) illustrates a case in which the rapid charge is conducted without exceeding the first threshold value, and in this case, the capacity equalization unit 155 does not operate.

In the above description, the method in which the type of charge is specified according to the SOC achieved after the charge, and the operation of the capacity equalization unit 155 is switched is described. However, as compared in FIG. 24, an inclination of the SOC change is different in the rapid charge and the general charge. For that reason, a threshold value may be provided for the SOC change, and the capacity equalization unit 155 may operate when the SOC change falls below the threshold value. Also, the rapid charge or the general charge may be distinguished according to a magnitude of the charge current, and whether the capacity equalization unit 155 operates may be determined.

The capacity equalization unit 155 according to this embodiment as described above detects the magnitude relationship of the full charging capacities of the electric cells 111 by $\Delta V$ or $\Delta SOC$, and transmits an instruction to the SOC equalization unit 153 on the basis of the magnitude relationship of the full charging capacities to equalize the full charging capacities. The electric cells 111 large in the full charging capacities are arranged so that the voltages or SOCs are high, and the electric cells 111 small in the full charging capacities are arranged so that the voltages or SOCs are low, whereby the degree of the progression of deterioration of the electric cells 111 is made different to eliminate the individual variability of the full charging capacities.

Further, the operation of the capacity equalization unit 155 is switched according to the charge current, the SOC change in the charge operation, or the level of the achieved SOC to realize the battery management device taking the influence on the capacity performance of the assembled battery 110 into account.

Fifth Embodiment

In a fifth embodiment described below, the processing contents of the capacity equalization unit 155 described in the fourth embodiment are changed. In the electric storage device according to the above-mentioned fourth embodiment, the magnitude relationship of the full charging capacities is grasped on the basis of differences of the voltages across the respective electric cells 111 in a no-load state, differences of the SOCS thereof, or the calculation results of the full charging capacities, and the SOC equalization unit 153 is operated on the basis of the magnitude relationship of the full charging capacities to manage the voltages or SOCs of the electric cells 111 so as to equalize the differences of the full charging capacities.

Figure 25:
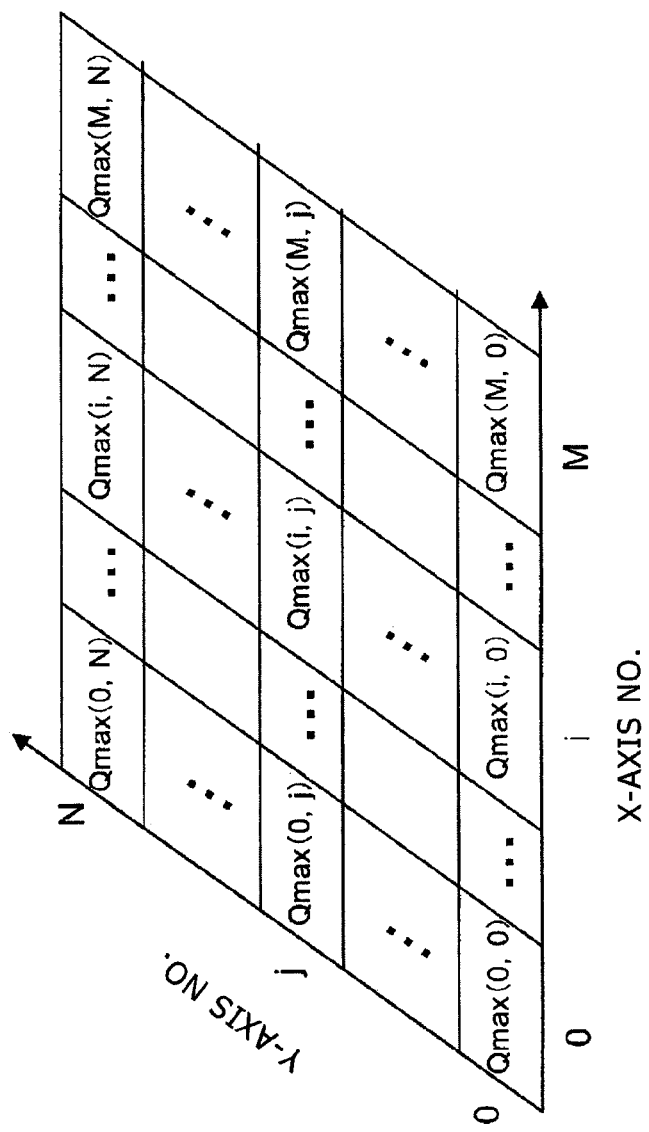
FIG. 25 is a diagram illustrating a method of storing the full charging capacities.

In this embodiment, values of the full charging capacities are measured during manufacturing of the electric cells 111, and the values are stored in storage means within the assembled battery control unit 150. FIG. 25 illustrates an example of a table of the measured full charging capacities.

The full charging capacities measured according to the layout (X-axis in a lateral direction, Y-axis in a depth) of the electric cells 111 when configuring the assembled battery 110 are stored in the storage means as a table Qmax(M, N). The capacity equalization unit 155 does not measure the magnitude relationship of the full charging capacities, but looks up this table Qmax(M, N) to acquire the full charging capacity values, and grasps the magnitude relationship of the full charging capacities. Whether the differences of the full charging capacities are eliminated by the layout of the voltages or SOCs in the capacity equalization unit 155 can be determined by the measurement of the above-mentioned magnitude relationship of the full charging capacities.

Also, the full charging capacities may be calculated with the use of the above-mentioned Expression (11) to rewrite the contents of the table. That is, the magnitude relationship of the full charging capacities is first grasped with the use of the table Qmax(M, N) to conduct the operation of eliminating the difference of the full charging capacities, and the table Qmax (M, N) is updated with the calculated Qmax when calculating the Qmax in order to determine whether the difference is eliminated.

FIG. 25 illustrates an example in which the full charging capacities are implemented in a two-dimensional table. When the electric cells 111 are connected in series with each other, for example, when 100 electric cells 111 are connected in series to configure the assembled battery 110, the electric cells 111 may be implemented as a one-dimensional table such as first cell, . . . , one-hundredth cell in the number of series. Alternatively, the full charging capacities may not be implemented as the table, but may be implemented as a function.

In this embodiment, the full charging capacities are measured in advance, and provided in the assembled battery control unit 150 as the table or function, thereby being capable of realizing the management method of the assembled battery 110 which can easily grasp the magnitude relationship of the full charging capacities, and eliminates the differences of the full charging capacities.

Sixth Embodiment

In a sixth embodiment described below, the method of implementing the full charging capacity values described in the fifth embodiment is changed. In the fifth embodiment, the values of the measured full charging capacities are stored in the assembled battery control unit 150 in use. On the other hand, in this embodiment, the electric cells 111 are arranged according to the values of the full charging capacities to configure the assembled battery 110. That is, the assembled battery 110 can be applied from an initial state when the full charging capacities are dispersed among the electric cells 111. Then, the capacity equalization unit 155 grasps the magnitude relationship of the full charging capacities according to a location where the electric cells 111 are arranged.

Figure 26:
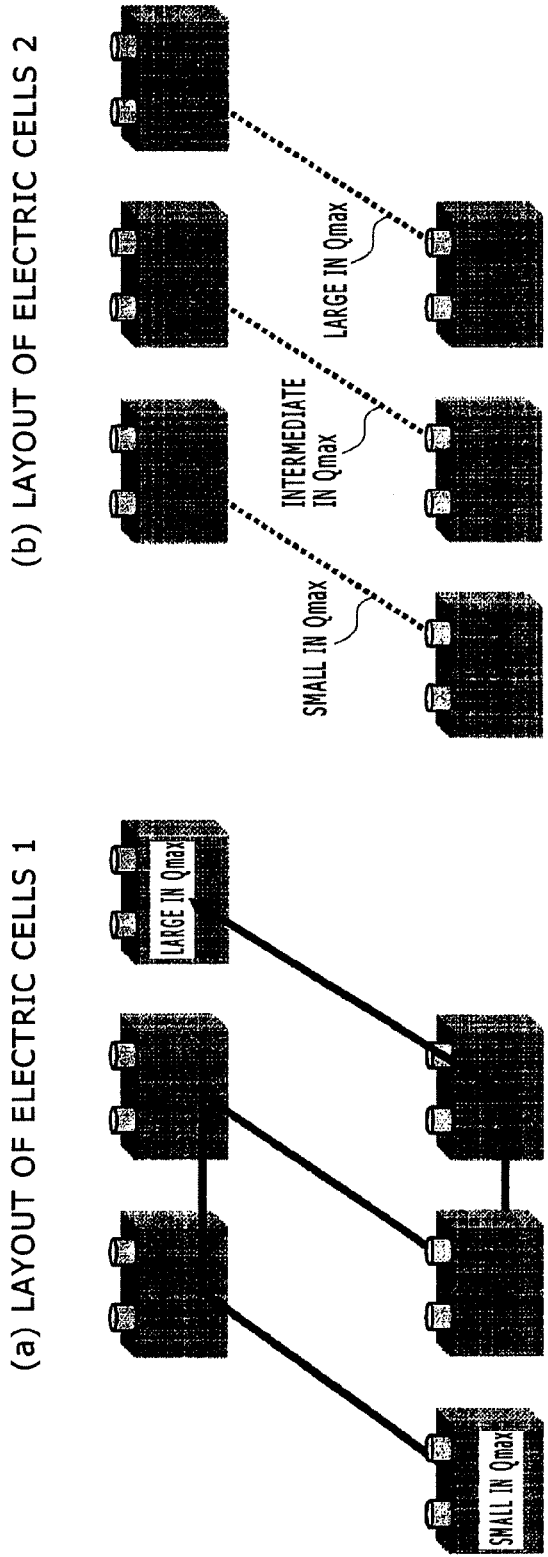
FIG. 26 is a diagram illustrating a layout of the electric cells 111 within the assembled battery 110 according to the performance.

FIG. 26 illustrates a method of arranging the electric cells 111 according to the values of the full charging capacities in this embodiment. In FIG. 26(a), the electric cells 111 are arranged in an ascending order of the full charging capacities (Qmax), and the electric cells 111 are arranged so that the last electric cell has the largest full charging capacity to configure the assembled battery 110. In FIG. 26(b), the results of measuring the full charging capacities for each of the electric cells 111 are ranked at given increments (small, intermediate, and large in Qmax in this example), and the electric cells 111 are arranged so that ranks of the full charging capacities match each other on each column.

The capacity equalization unit 155 grasps the magnitude relationship of the full charging capacities according to the layout of the electric cells 111, and transmits an instruction to the SOC equalization unit 153 in order to generate the voltage or SOC dispersion for eliminating the difference of the full charging capacities. The determination of whether the difference of the full charging capacities is eliminated by the voltage or SOC dispersion realized by the capacity equalization unit 155 can be conducted by, for example, measuring the above-mentioned magnitude relationship of the full charging capacities.

As described above, in the present invention, the processing of eliminating the performance individual variability can be flexibly executed according to the magnitude relationship of the performance, and a state in which the cells are placed. The management method of the voltages or SOCs of the electric cells 111 in the electric storage device can be extensively applied to a field in which the electric cells 111 are connected in series with each other.

In the above-mentioned embodiment, all of the electric cells 111 configuring the assembled battery 110 are connected in series with each other. However, the present invention is not limited to this configuration, but can be applied to any configuration including the electric cells 111 connected in series with each other. For example, even in a configuration in which a plurality of battery groups connected in parallel is connected in series with each other, or a configuration in which a plurality of electric cell groups in which a plurality of electric cells is connected in series is connected in parallel to each other, the above-mentioned control can be applied to the electric cells or the battery groups having a series relationship.

A variety of embodiments and modified examples have been described above. The respective embodiments may be used, individually, or in combination. This is because the advantageous effects of the respective embodiments can be obtained, individually, or synergistically. Also, in the first to third embodiments, the SOC equalization unit 153 is operated on the basis of the magnitude relationship of the internal resistances. Alternatively, the magnitude relationship of the full charging capacities may be detected to realize the operation of the SOC equalization unit 153 described in the first to third embodiments according to this detection. Further, the SOC equalization unit 153 is operated on the basis of the magnitude relationship of the full charging capacities in the fourth to sixth embodiments. Likewise, the magnitude relationship of the internal resistances is detected, and the operation of the SOC equalization unit 153 described in the fourth to sixth embodiments can be realized according to the detection. The present invention is not limited to the above embodiments so far as the features of the present invention do not fail. The other configurations conceivable within the technical concept of the present invention are also included in the scope of the present invention.

The invention claimed is:

1. An electric storage device, comprising:
   an assembled battery having a plurality of electric cells connected in series;
   a battery state quantity estimator estimating battery state quantities of the plurality of electric cells;
   a discharge quantity calculator calculating such a discharge quantity that state of charges (SOCs) of the respective electric cells that have been discharged have a given magnitude relationship corresponding to the battery state quantities, for each of the electric cells; and
   a discharging circuit that discharges the plurality of electric cells on the basis of the discharge quantity calculated by the discharge quantity calculator;
   wherein the battery state quantity estimator estimates a magnitude relationship of internal resistances of the plurality of electric cells, and
   wherein the discharge quantity calculator calculates such a discharge quantity that SOCs of the electric cells which are estimated to be larger in the magnitude relationship of internal resistances by the battery state quantity estimator become low.

2. The electric storage device according to claim 1, further comprising:
   a voltage measurement unit that measures the respective voltages across the plurality of electric cells before a current that flows in the assembled battery changes and after the current changes,
      wherein the battery state quantity estimator estimates the magnitude relationship of the respective internal resistances of the plurality of electric cells from a difference between the voltage before the current changes and the voltage after the current changes, which are measured by the voltage measurement unit.

3. The electric storage device according to claim 1, comprising:
a voltage measurement unit that measures the voltages across the plurality of electric cells; and
a current measurement unit that measures a current value flowing in the plurality of electric cells connected in series,
wherein the battery state quantity estimator means calculates the internal resistances of the plurality of electric cells on the basis of the voltage values measured by the voltage measurement unit, and the current value measured by the current measurement unit, and estimates the magnitude relationship from a calculation result.

4. The electric storage device according to claim 1, comprising:
an SOC equalization unit that discharges the plurality of electric cells, individually, to equalize the SOCs of the plurality of electric cells,
wherein discharge is conducted by the discharging circuit after the SOCs have been equalized by the SOC equalization unit.

5. The electric storage device according to claim 1,
wherein the battery state quantity estimator estimates the magnitude relationship of the full charging capacities of the plurality of electric cells, and
wherein the discharge quantity calculator calculates such a discharge quantity that SOCs of the electric cells which are estimated to be smaller in the magnitude relationship by the battery state quantity estimator become low.

6. The electric storage device according to claim 5, comprising:
a voltage measurement unit that measures the voltages across the plurality of electric cells which is in a no-load state before the assembled battery is charged or discharged, and the voltages across the plurality of electric cells which is in the no-load state after the assembled battery is charged or discharged,
wherein the battery state quantity estimator estimates the magnitude relationship of the full charging capacities from a difference between the voltages across the plurality of electric cells before been charged or discharged, and the voltages across the plurality of electric cells after been charged or discharged, which are measured by the voltage measurement unit, or estimates the magnitude relationship of the full charging capacities from an SOC difference between the SOCs based on the voltages across the plurality of electric cells before being charged or discharged, and the SOCs based on the voltages across the plurality of electric cells after being charged or discharged.

7. The electric storage device according to claim 5,
a voltage measurement unit that measures the voltages across the plurality of electric cells; and
a current measurement unit that measures a current value flowing in the plurality of electric cells connected in series,
wherein the battery state quantity estimator calculates the full charging capacities of the plurality of electric cells on the basis of the voltage values measured by the voltage measurement unit, and the current value measured by the current measurement unit, and estimates the magnitude relationship from a calculation result.

8. The electric storage device according to claim 7,
a storage unit in which default values of the respective full charging capacities of the plurality of electric cells are stored in advance; and
wherein the discharge quantity calculator calculates such a discharge quantity that the SOCs after the electric cells are discharged become lower as the full charging capacities of the electric cells, which are stored in the storage unit, are smaller, for each of the electric cells.

9. The electric storage device according to claim 2,
wherein the discharge quantity is set so that the SOC difference between before and after the discharge by the discharging circuit is equal to or larger than an SOC error caused by a measurement error of the voltage measurement unit.

10. The electric storage device according to claim 2,
wherein the discharge quantity calculator classifies the plurality of electric cells into a plurality of groups on the basis of the magnitude relationship estimated by the battery state quantity estimator, sets the SOCs after the electric cells are discharged for each of the groups, and calculates the discharge quantities of the plurality of electric cells on the basis of those set values.

11. The electric storage device according to claim 1,
wherein the discharge quantity by the discharging circuit is increased or decreased in correspondence with a high-low level of the temperature of the assembled battery, or a high-low level of the SOC of the assembled battery.

12. The electric storage device according to claim 1, comprising:
a voltage measurement unit that measures the voltages across the plurality of electric cells;
a current measurement unit that measures a current value flowing in the plurality of electric cells connected in series; and
a full charging capacity estimator estimating the respective full charging capacities of the plurality of electric cells on the basis of the voltage values measured by the voltage measurement unit, and the current value measured by the current measurement unit,
wherein the battery state estimator estimates the SOC on the basis of the voltage value measured by the voltage measurement unit, and estimates respective arrival SOCs when charging the plurality of electric cells by a given charge quantity from the SOC estimation,
wherein the discharge quantity calculator calculates such discharge quantities that the SOCs of the respective electric cells match each other when the plurality of electric cells is charged by a given charging quantity, on the basis of the arrival SOCs estimated by the battery state estimator.

13. The electric storage device according to claim 12,
wherein the given charge quantity is set to such a value that a minimum SOC in the SOCs of the respective electric cells arrives at an upper limit SOC of a battery use range when the respective electric cells are charged by the given charge quantity.

14. The electric storage device according to claim 12,
wherein the given charge quantity is increased or decreased in correspondence with a high-low level of the temperature of the assembled battery.

15. The electric storage device according to claim 1, comprising:
a rapid charging determination unit that determines whether the charge operation when charging the assembled battery by an external power supply is a rapid charge operation, wherein the charging circuit does not conduct the discharge operation if the rapid charging determination unit determines that the charge operation is the rapid charge operation.

16. The electric storage device according to claim 1, comprising:

a temperature determination unit that determines whether a rising temperature of one or more of the electric cells configuring the assembled battery is equal to or higher than a threshold value, wherein the discharging circuit does not conduct the discharge operation if the temperature determination unit determines that the rising temperature is equal to or higher than the threshold value.

17. The electric storage device according to claim 1, further comprising:

a limiter limiting an allowable current value and an allowable power value when charging or discharging the assembled battery to smaller values when the discharge operation is conducted by the discharging circuit.

18. The electric storage device according to claim 1, further comprising:

a changer changing a value of an upper limit SOC or a lower limit SOC when charging or discharging the assembled battery to be higher or lower when the discharge operation is conducted by the discharging circuit.

19. The electric storage device according to claim 6, wherein the discharge quantity is set so that the SOC difference between before and after the discharge by the discharging circuit is equal to or larger than an SOC error caused by a measurement error of the voltage measurement unit.

20. The electric storage device according to claim 6, wherein the discharge quantity calculator classifies the plurality of electric cells into a plurality of groups on the basis of the magnitude relationship estimated by the battery state quantity estimator, sets the SOCs after the electric cells are discharged for each of the groups, and calculates the discharge quantities of the plurality of electric cells on the basis of those set values.

* * * * *